US011552837B2

(12) United States Patent
Sung et al.

(10) Patent No.: US 11,552,837 B2
(45) Date of Patent: Jan. 10, 2023

(54) UPLINK TIMING AND FREQUENCY OFFSET ESTIMATION AND COMPENSATION FOR CSI ESTIMATION AND TRACKING

(71) Applicant: Samsung Electronics Co., Ltd., Suwon-si (KR)

(72) Inventors: Junmo Sung, Richardson, TX (US); Yang Li, Plano, TX (US); Rui Wang, San Jose, CA (US); Yeqing Hu, Allen, TX (US); Jin Yuan, Richardson, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/143,957

(22) Filed: Jan. 7, 2021

(65) Prior Publication Data

US 2021/0218612 A1 Jul. 15, 2021

Related U.S. Application Data

(60) Provisional application No. 63/089,065, filed on Oct. 8, 2020, provisional application No. 62/960,364, filed on Jan. 13, 2020.

(51) Int. Cl.
*H04L 27/26* (2006.01)
*H04L 25/02* (2006.01)
(Continued)

(52) U.S. Cl.
CPC ........ *H04L 27/2657* (2013.01); *H04L 5/0012* (2013.01); *H04L 5/0048* (2013.01); *H04L 25/0226* (2013.01); *H04W 72/0413* (2013.01)

(58) Field of Classification Search
None
See application file for complete search history.

(56) References Cited

U.S. PATENT DOCUMENTS 8,238,496 B1    8/2012 Narasimhan et al.
9,935,794 B1*   4/2018 Cao ..................... H04B 7/0413
(Continued)

FOREIGN PATENT DOCUMENTS

CN    106788890 A    5/2017
EP    2774358 B1     5/2016
(Continued)

OTHER PUBLICATIONS

International Search Report of the International Searching Authority in connection with International Application No. PCT/KR2021/000418 dated Apr. 26, 2021, 5 pages.
(Continued)

*Primary Examiner* — Otis L Thompson, Jr.

(57) ABSTRACT

Methods and apparatuses in a wireless communication system. A method of operating a base station (BS) includes receiving a set of uplink signals; estimating, based on a subset of the set of uplink signals, uplink channels; estimating a timing offset (TO) and a frequency offset (FO) for a subset of the estimated uplink channels; compensating, based on the estimated TO and FO, the subset of the estimated uplink channels to generate TO and FO compensated uplink channel estimates; and generating channel prediction information based on the compensated subset of the estimated uplink channels.

20 Claims, 17 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 10,171,217 B2* | 1/2019 | Brent | H04B 7/0456 |
| 2010/0085866 A1* | 4/2010 | Li | H04L 27/2657 |
| | | | 370/344 |
| 2012/0120945 A1 | 5/2012 | Alexander et al. | |
| 2015/0326362 A1* | 11/2015 | Xiong | H04W 76/10 |
| | | | 370/336 |
| 2016/0373246 A1 | 12/2016 | Yoon | |
| 2017/0250740 A1* | 8/2017 | Liang | H04L 5/0048 |
| 2017/0347340 A1 | 11/2017 | Haley et al. | |
| 2018/0006743 A1* | 1/2018 | Zhu | H04B 17/336 |
| 2018/0358688 A1* | 12/2018 | Yue | H04W 4/025 |
| 2021/0067313 A1* | 3/2021 | Yu | H04J 3/0685 |

FOREIGN PATENT DOCUMENTS

| | | |
|---|---|---|
| WO | 2015/130047 A1 | 9/2015 |
| WO | 2016/090411 A1 | 6/2016 |

OTHER PUBLICATIONS

"3rd Generation Partnership Project; Technical Specification Group Radio Access Network; NR; Physical channels and modulation (Release 16)", 3GPP TS 38.211 v16.2.0, Jun. 2020, 131 pages.

"3rd Generation Partnership Project; Technical Specification Group Radio Access Network; NR; Multiplexing and channel coding (Release 16)", 3GPP TS 38.212 v16.2.0, Jun. 2020, 151 pages.

"3rd Generation Partnership Project; Technical Specification Group Radio Access Network; NR; Physical layer procedures for control (Release 16)", 3GPP TS 38.213 v16.2.0, Jun. 2020, 176 pages.

* cited by examiner

UPLINK TIMING AND FREQUENCY OFFSET ESTIMATION AND COMPENSATION FOR CSI ESTIMATION AND TRACKING

CROSS-REFERENCE TO RELATED APPLICATIONS AND CLAIM OF PRIORITY

The present application claims priority to U.S. Provisional Patent Application No. 62/960,364, filed on Jan. 13, 2020 and U.S. Provisional Patent Application No. 63/089,065, filed on Oct. 8, 2020. The content of the above-identified patent document is incorporated herein by reference.

TECHNICAL FIELD

The present disclosure relates generally to wireless communication systems and, more specifically, the present disclosure relates to uplink timing and frequency offset estimation and compensation for channel state information (CSI) estimation and tracking.

BACKGROUND

Massive MIMO (mMIMO) technology is an important technology to improve the spectral efficiency of $4^{th}$ generation (4G) and 5G cellular networks. A number of antennas in mMIMO is typically much larger than the number of user equipment (UE), which allows base station (BS) to perform multi-user downlink (DL) beamforming to schedule parallel data transmission on the same time-frequency resources. However, performance of mMIMO depends heavily on the quality of CSI at a BS. It has been recently verified that the multi user-MIMO (MU-MIMO) performance degrades according to UE mobility.

SUMMARY

The present disclosure relates to wireless communication systems and, more specifically, the present disclosure relates to uplink timing and frequency offset estimation and compensation for channel state information (CSI) estimation and tracking.

In one embodiment, a base station BS in a wireless communication system is provided. The BS comprises a transceiver configured to receive a set of uplink signals. The BS further comprises a processor operably connected to the transceiver, the processor configured to: estimate, based on a subset of the set of uplink signals, uplink channels; estimate a timing offset (TO) and a frequency offset (FO) for a subset of the estimated uplink channels; compensate, based on the estimated TO and FO, the subset of the estimated uplink channels to generate TO and FO compensated uplink channel estimates; and generate channel prediction information based on the compensated subset of the estimated uplink channels.

In another embodiment, a method of a BS in a wireless communication system is provided. The method comprises: receiving a set of uplink signals; estimating, based on a subset of the set of uplink signals, uplink channels; estimating a TO and an FO for a subset of the estimated uplink channels; compensating, based on the estimated TO and FO, the subset of the estimated uplink channels to generate TO and FO compensated uplink channel estimates; and generating channel prediction information based on the compensated subset of the estimated uplink channels.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
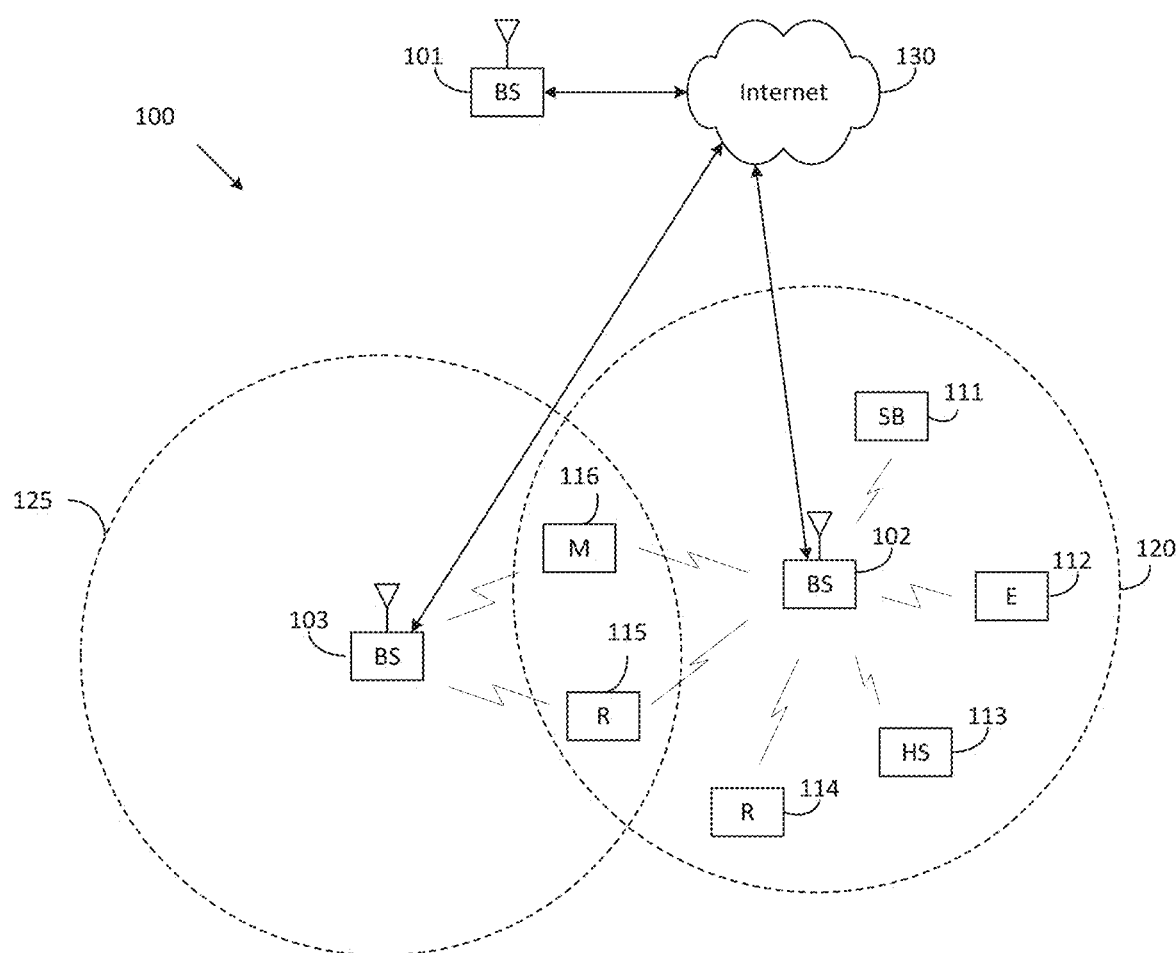
FIG. 1 illustrates an example wireless network according to embodiments of the present disclosure.
Figure 2:
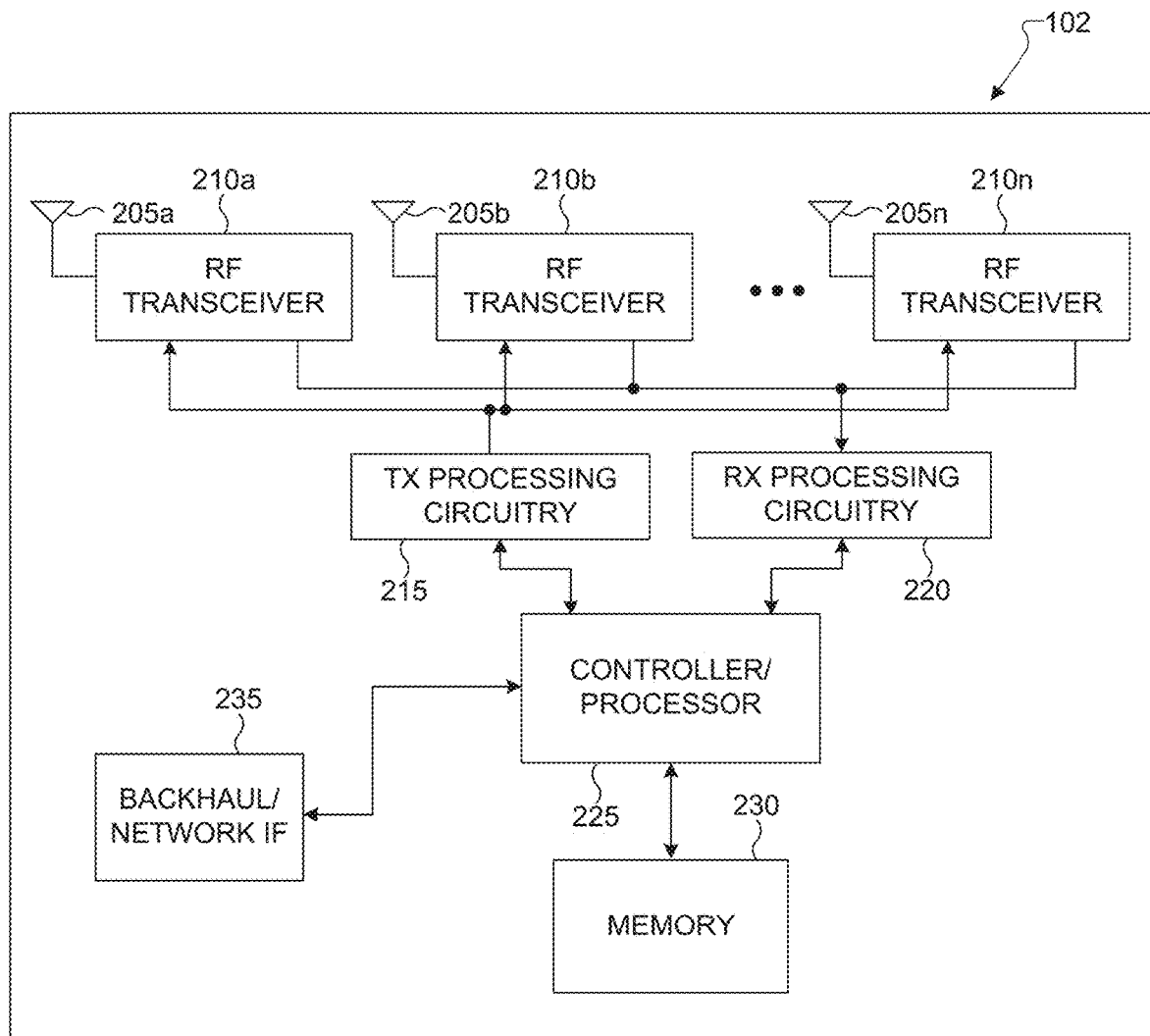
FIG. 2 illustrates an example gNB according to embodiments of the present disclosure.
Figure 3:
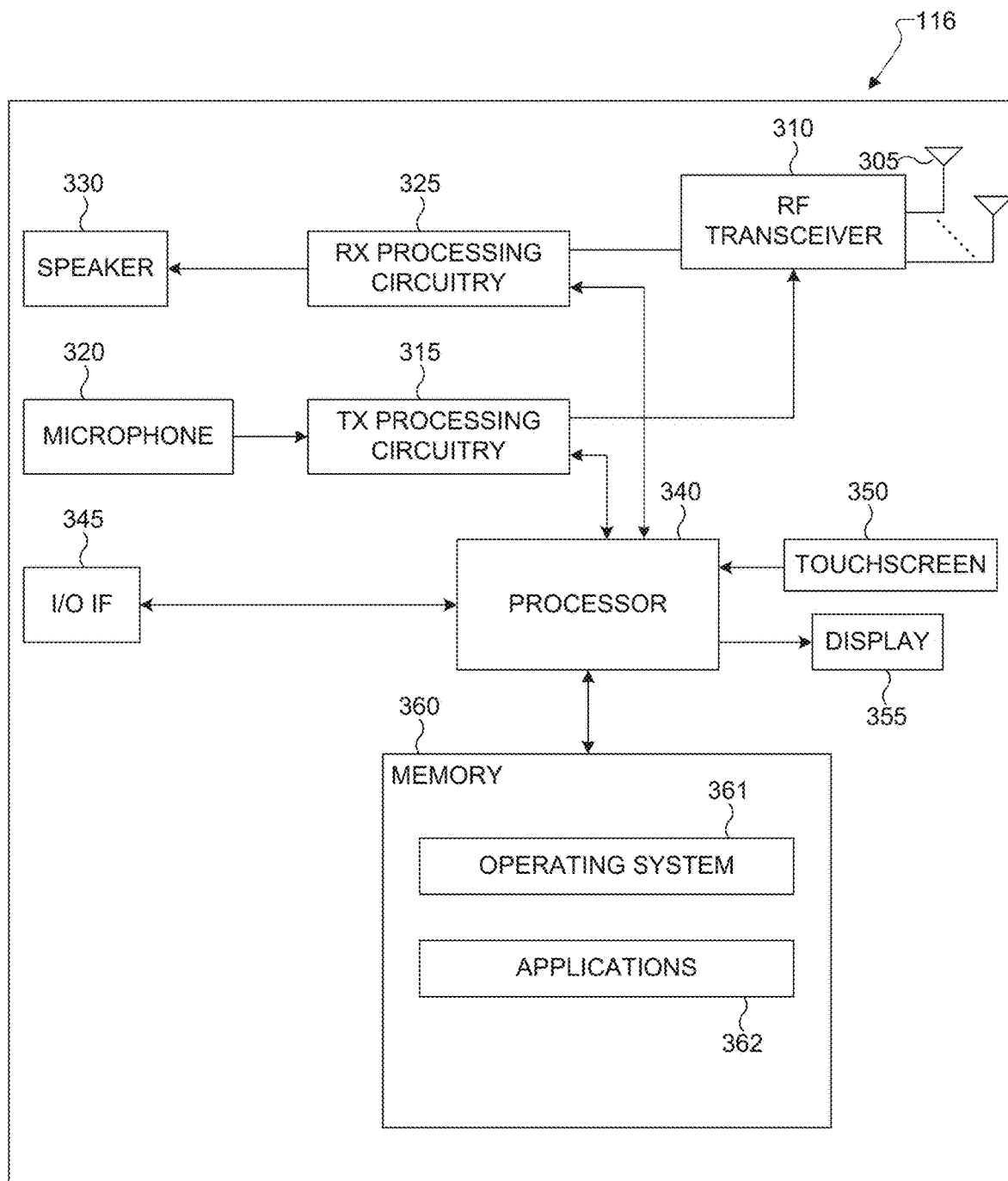
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for UEs. In certain embodiments, and one or more of the gNBs 101-103 includes circuitry, programing, or a combination thereof for UEs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used.

For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
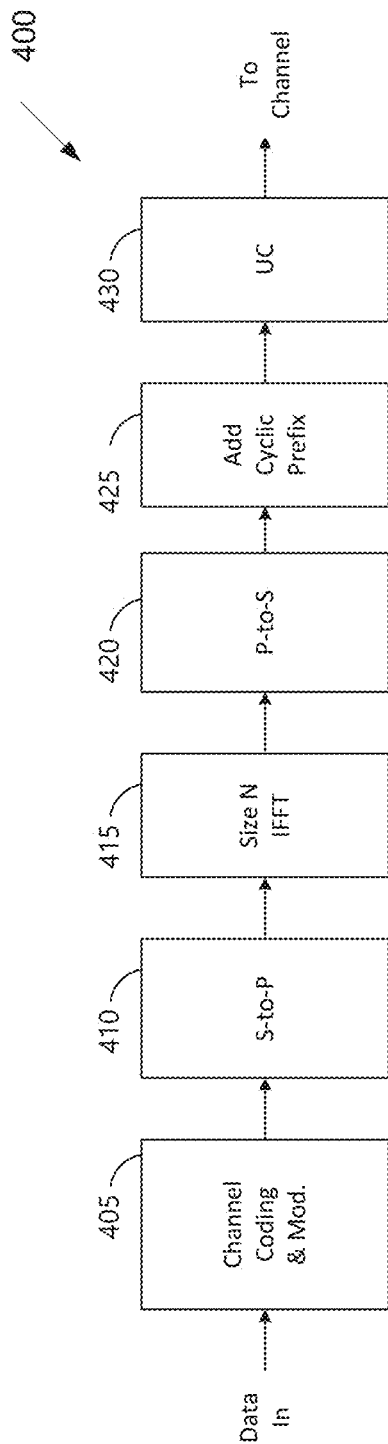
FIG. 4 illustrates an example DL slot structure according to embodiments of the present disclosure.
Figure 5:
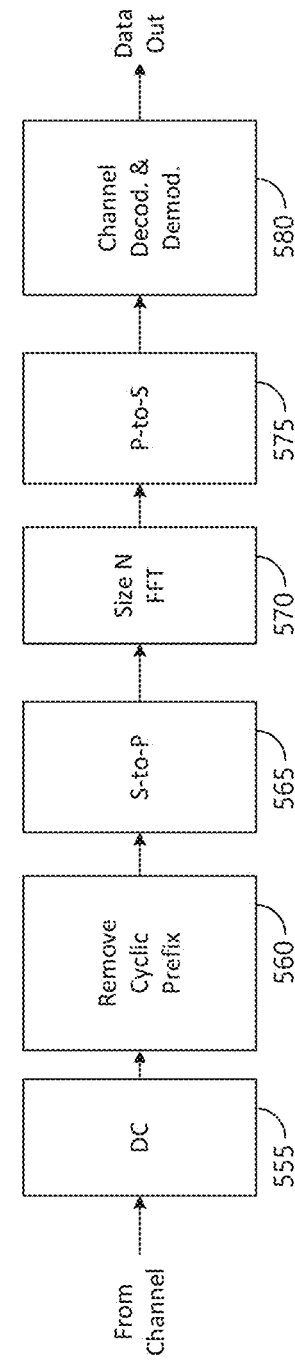
FIG. 5 illustrates an example UL slot structure for PUSCH transmission or PUCCH transmission according to embodiments of the present disclosure.

FIG. 4 and FIG. 5 illustrate example wireless transmit and receive paths according to this disclosure. In the following description, a transmit path 400 may be described as being implemented in an gNB (such as gNB 102), while a receive path 500 may be described as being implemented in a UE (such as UE 116). However, it may be understood that the receive path 500 can be implemented in an gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to gNBs 101-103 and may implement the receive path 500 for receiving in the downlink from gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
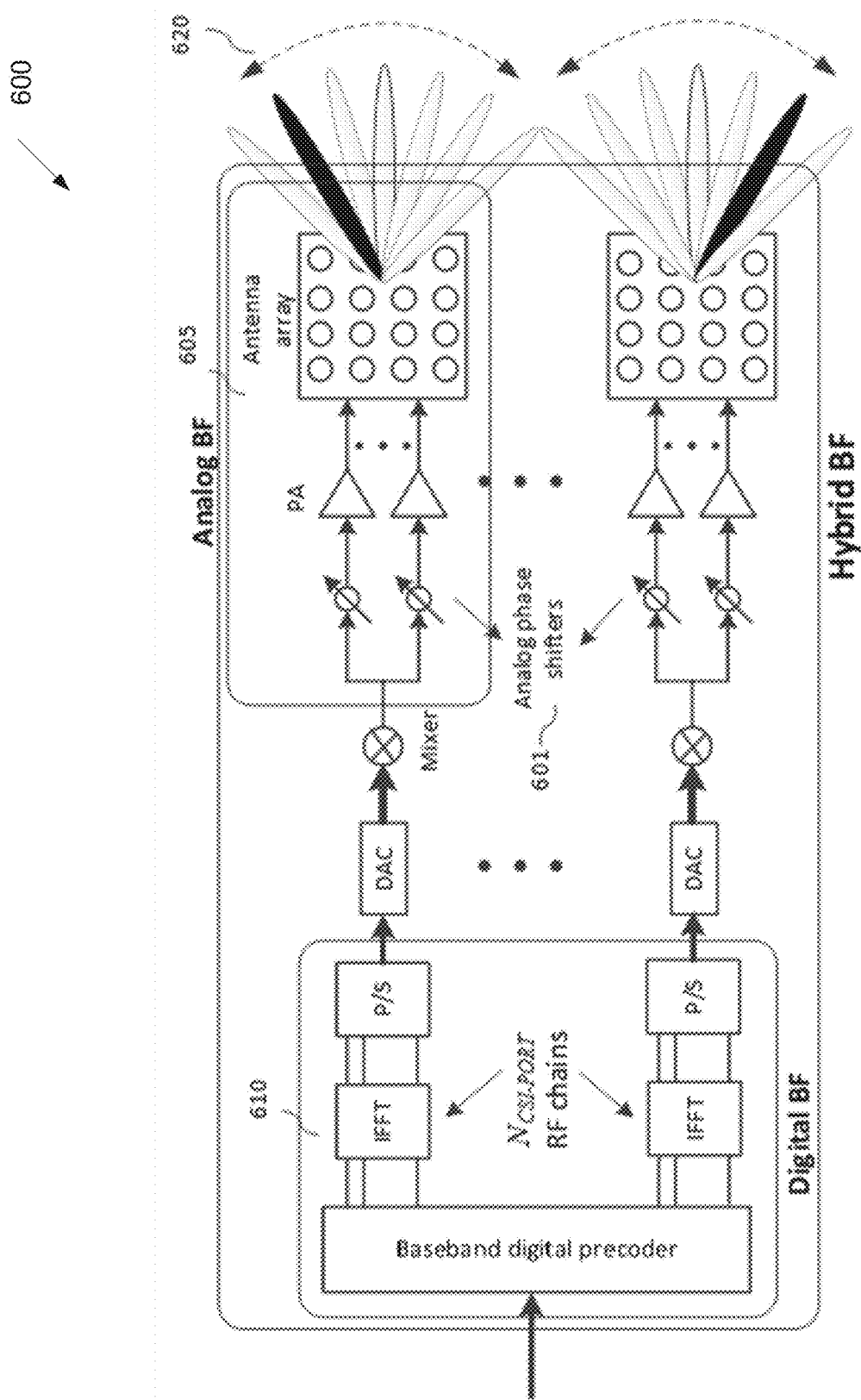
FIG. 6 illustrates an example beam forming architecture according to embodiments of the present disclosure.

FIG. 6 illustrates an example beam forming architecture 600 according to embodiments of the present disclosure. An embodiment of the beam forming architecture 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs) at mmWave frequencies) as illustrated by beamforming architecture 600 in FIG. 6.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

The channel state information is quickly out-of-date for mMIMO BS which relies on sounding reference signal (SRS) sent by a UE in the network. This greatly reduce the performance of mMIMO DL MU-MIMO transmission with mobile UEs. In addition, the received SRS is corrupted with UE's autonomous timing and frequency alignment efforts.

The present disclosure describes a new timing and frequency offset estimation/correction method that is caused by UE's autonomous uplink timing and frequency alignment efforts. The estimation and correction method takes both full-band (e.g., frequency non-hopped) and sub-band (e.g., frequency-hopped) SRS modes into account. The offsets are estimated in the frequency domain by coherently combining offsets over multiple antennas and compensated. The operation is composed of initial and tracking stages. The initial stage is designed to simultaneously correct multiple SRS time instances, and the tracking stage corrects one instance.

Uplink timing and frequency offsets are unavoidable effect that are caused by UEs. A random timing offset in the present disclosure refers to the sample-wise UL timing adjustment performed by a UE at random time instances depending on UE's own assessment of its time drift to eNB/gNB.

Figure 7:
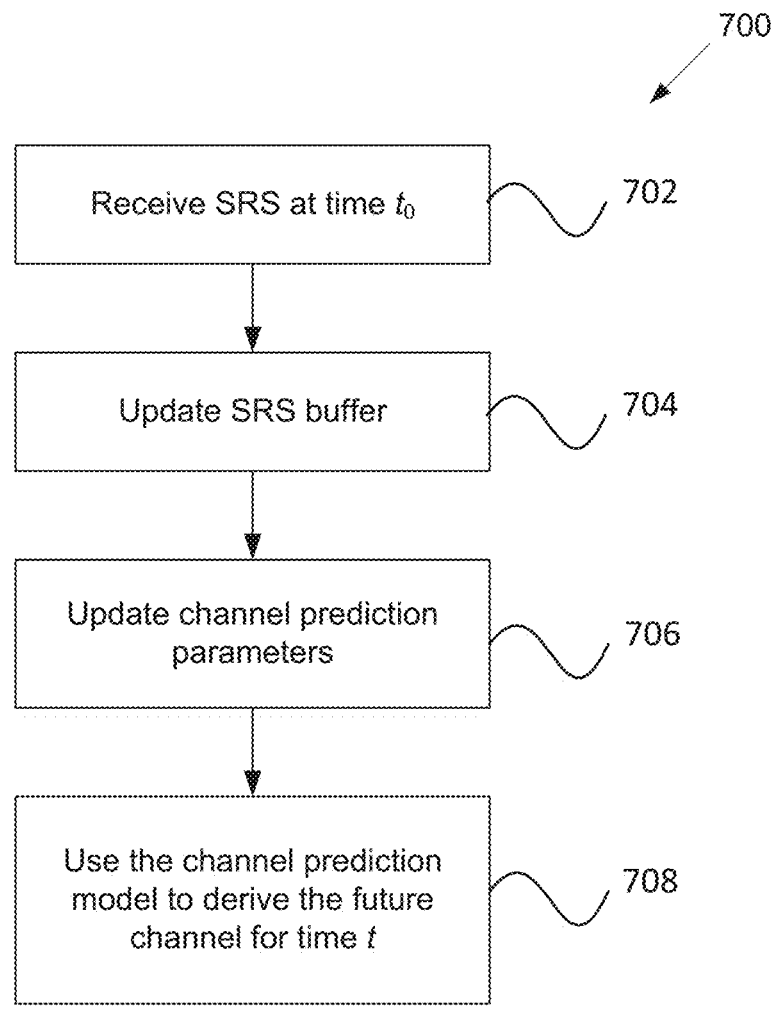
FIG. 7 illustrates a flowchart of a method for channel derivation according to embodiments of the present disclosure.

FIG. 7 illustrates a flowchart of a method 700 for channel derivation according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, the method 700 begins at step 702. In step 702, a UE receives SRS at time to. In step 704, the UE updates SRS buffer. In step 706, the UE further updates channel prediction parameters. Finally, the UE in step 708 uses the channel prediction model to derive the future channel for time t.

Each UE tries to correct a carrier frequency offset (CFO) based on downlink signals from eNB and leaves an unpredictable amount of a residual CFO. The impact of the random residual CFO is to induce a random phase rotation on SRS observed by eNB/gNB, and such phase rotation is common to all eNB/gNB antennas and all frequency samples in the same SRS symbol.

Figure 8:
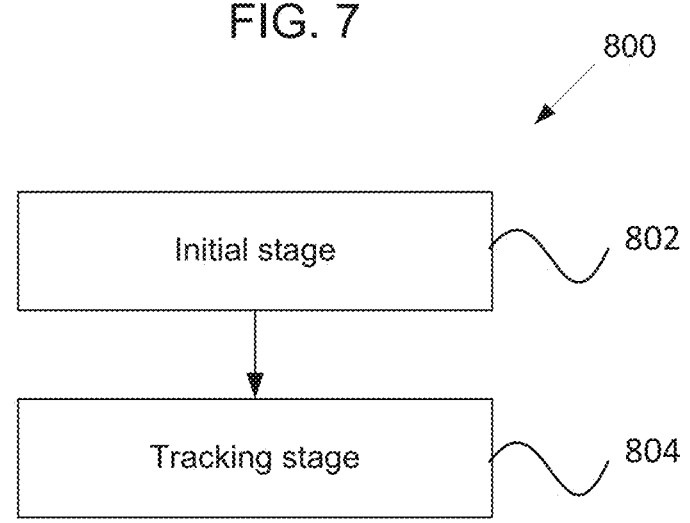
FIG. 8 illustrates a flowchart of a method for two sequential stages according to embodiments of the present disclosure.

FIG. 8 illustrates a flowchart of a method 800 for two sequential stages according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

The offset estimation and compensation process can be implemented two sequential stages as illustrated in FIG. 8. As illustrate in FIG. 8, the method 800 comprises initial stage (e.g., 802) and a tracking stage (e.g., 804). The initial stage is performed once at the beginning and may be performed once in a while if needed, and then the tracking stages is iteratively performed. In the present disclosure, the number of SRS instances are generally more than one which requires both the initial and the tracking stages. In case one SRS instance is used, the initial stage 802 may be skipped. In cases where the received SRS does not satisfy requirements (e.g., low received SNR/power), the tracking stage 604 may be skipped.

Figure 10:
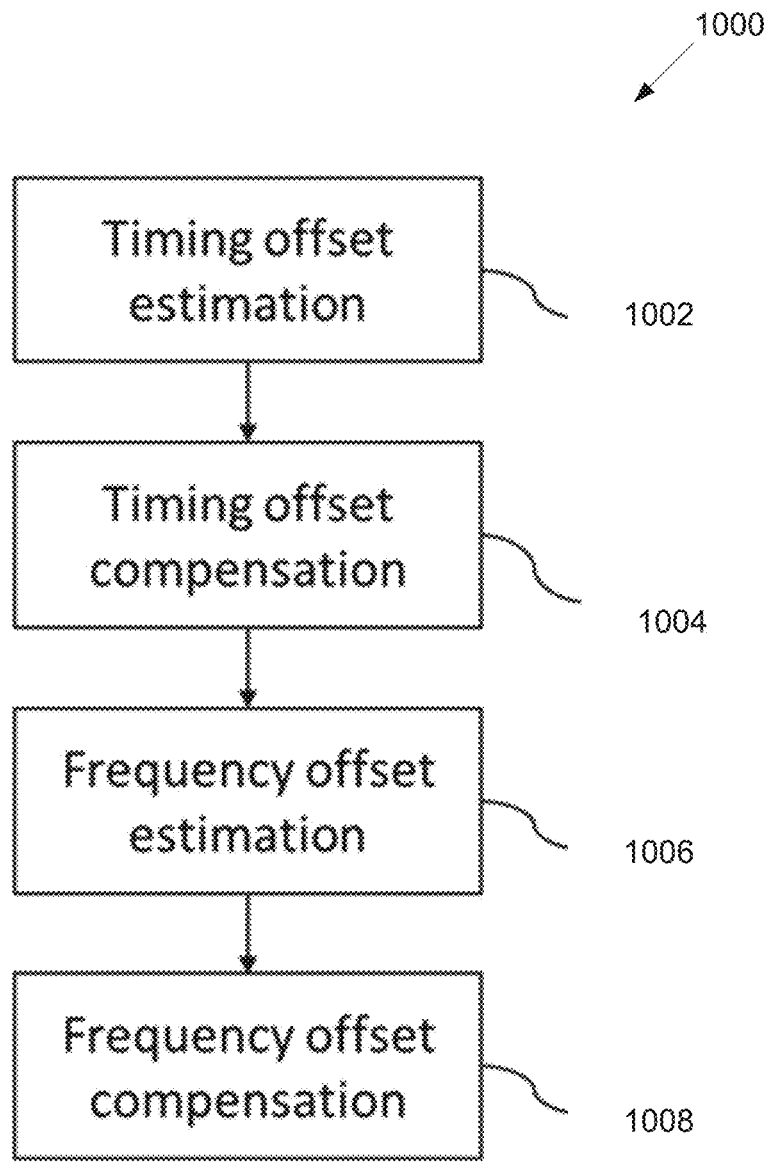
FIG. 10 illustrates another flowchart of a method for time and frequency offset estimation and compensation according to embodiments of the present disclosure.

In one embodiment, TO and FO estimation and compensation are provided as shown in FIG. 10. As an overall procedure of the initial and tracking stages is similar, operation from 1002 to 1008 can be considered to be common in both the initial stage 802 and the tracking stage 804. In some embodiments, the order of four operations (e.g., 1002, 1004, 1006, and 1008) may change.

Figure 9:
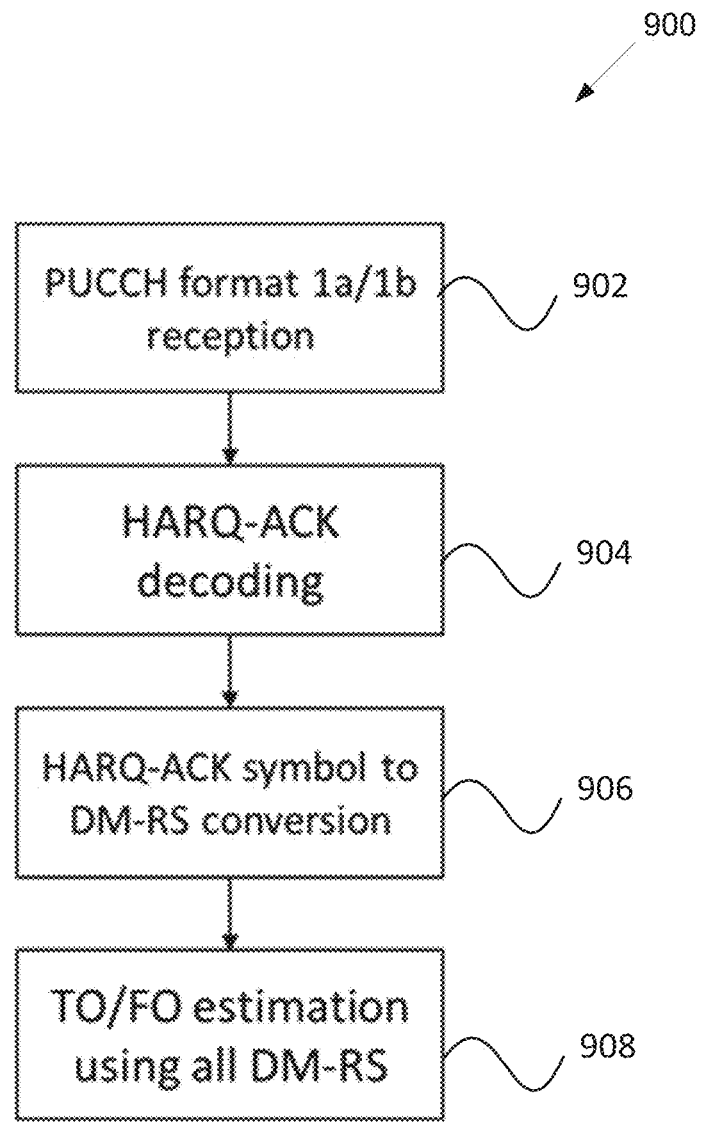
FIG. 9 illustrates a flowchart of a method for time and frequency offset estimation and compensation according to embodiments of the present disclosure.

TO and FO can be estimated using different resources. In one embodiment, physical uplink control channel (PUCCH) is used. For these purposes, DMRS of PUCCH with format 1a/1b or 3 is used. When a UE is configured for periodic CSI reporting, format 2 can also be used. In case of PUCCH format 1a/1b, hybrid automatic repeat request-acknowledgement (HARQ-ACK) symbol can also be used as if they are DMRS for TO and FO estimation once a decision on acknowledgement/negative-acknowledgement (ACK/NACK) value is made. Then, the $1^{st}/2^{nd}/3^{rd}$ symbols can be correlated with $5^{th}/6^{th}/7^{th}$ symbols in each slot or symbols in different subframes can also be correlated for TO and FO estimation. Refer to FIG. 9 for the specific procedure to PUCCH format 1a/1b.

FIG. 9 illustrates a flowchart of a method 900 for time and frequency offset estimation and compensation according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, the method 900 begins at step 902. In step 902, a UE receive PUCCH format 1a/1b. In step 904, the UE decodes HARQ-ACK. Next, in step 906, the UE converts the HARQ-ACK symbol to DMRS. Finally, the UE in step 908 estimates TO and FO using all DMRS.

In another embodiment, PUSCH is used. For example, DMRS of PUSCH can be used for TO and FO estimation. In another embodiment, PT-RS in 5G NR is used.

Henceforth, TO and FO are estimated using SRS. Nevertheless, the algorithms described in the present disclosure are not limited to SRS and can use other resources described earlier at least in some part of the algorithms.

FIG. 10 illustrates another flowchart of a method 1000 for time and frequency offset estimation and compensation according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In one embodiment, the full-band SRS which occupies a majority of bandwidth is provided. In this embodiment, random timing offset estimation and compensation (e.g., operation 1002 and 1004) in the initial stage (e.g., the initial stage 802) is as follows.

Timing offset estimation and compensation may remove the random integer timing offsets that corrupt channel path delay estimates.

Let $y_{k,m,n}$ be the SRS channel estimate at the k-th antenna, the m-th RB and the n-th SRS capture time instance. For every SRS time instance, the delay center of gravity (CoG) is computed using the following equation:

$$\tau_{cog,n} = \frac{\angle\left(\sum_k \sum_m y_{k,m+\Delta m,n} \cdot y^*_{k,m,n}\right)}{-2\pi\Delta m \Delta f_{rb}} [S]$$

where $\Delta m$ is the integer frequency lag in terms of RB and $\Delta f_{rb}$ is the RB frequency spacing.

For example, if delay CoG is computed by comparing the adjacent RBs, $\Delta m$ is set to one. With the help from a modem, a part of the above equation, $\Sigma_m y_{k,m+\Delta m,n} \cdot y_{k,m,n}^*$, can also be performed at a resource element (RE) level, which may help achieve more accurate delay estimation. In this case, the modem may deliver $N_{ant}$ computation results or the SRS REs so that the prediction core can perform rest of the processing.

Once the delay CoG is computed, an integer timing offset jump between the adjacent SRS time snapshots is determined by comparing $$\tau_{cog,n}, \text{i.e.}, l_{TO,n} = sign(\tau_{cog,n} - \tau_{cog,n-1})floor\left(\frac{|\tau_{cog,n} - \tau_{cog,n-1}|}{\alpha T_s}\right),$$

and can be further limited within a predefined range, e.g., $[-1_{maxTO}, 1_{maxTO}]$. The scalar inside the floor function, $\alpha$, can be used to scale $T_s$. This is to tolerate errors in delay estimation which cannot exactly be a multiple of $T_s$.

The estimated integer timing offset jump is removed from the n-th SRS estimate using the following equation: $y_{k,m,n}' = y_{k,m,n} \cdot e^{j2\pi m \Delta f_{rb} l_{TO,n} T_s}$.

One thing that needs to be ensured is this TO jump correction may be performed with respect to the common timing reference point. For example, the correction on the $2^{nd}$ SRS may first be conducted, and the correction on the $3^{rd}$ SRS may be performed based on the corrected $2^{nd}$ SRS. In this example, the delay CoG of the $1^{st}$ SRS can be a reference point and that the reference propagates through timing offset correction on every SRS in the buffer.

In another embodiment, another SRS may be used as a reference. The process can be summarized in the pseudo-code as shown in TABLE 1.

TABLE 1

The pseudo-code $\tau_{cog,1} \leftarrow \frac{\angle(\Sigma_k \Sigma_m y_{k,m+\Delta m,1} \cdot y^*_{k,m,1})}{-2\pi\Delta m \Delta f_{rb}}$, $\forall m$ and $\forall k$ for n = 2 to $N_{srs}$ do $\tau_{cog,n} \leftarrow \frac{\angle(\Sigma_k \Sigma_m y_{k,m+\Delta m,n} \cdot y^*_{k,m,n})}{-2\pi\Delta m \Delta f_{rb}}$, $\forall m$ and $\forall k$ TABLE 1-continued The pseudo-code $l_{TO,n} \leftarrow sign(\tau_{cog,n} - \tau_{cog,n-1}) \; floor\left(\frac{|\tau_{cog,n} - \tau_{cog,n-1}|}{\alpha T_s}\right)$ $y_{k,m,n} \leftarrow y_{k,m,n} \cdot e^{j2\pi m \Delta f_{rb} l_{TO,n} T_s}$, $\forall m$ and $\forall k$
end for This approach is robust to the frequency/phase offset since the approach relies on the slope of the channel estimate phase. The absolute phase changes due to frequency offsets do not affect the slope. Therefore, the proper order of correction is to perform TO correction followed by FO correction.

Random frequency offset estimation and compensation (e.g., 1006 and 1008 as illustrated in FIG. 10) in the initial stage (e.g., the initial stage 802) is as follows. Based on an assumption that timing offset estimation and compensation (e.g., 1002 and 1004 as illustrated in FIG. 10) is successfully performed, frequency offsets can be estimated and compensated using the TO-corrected measurements, $y_{k,m,n}'$.

A frequency offset is estimated using two adjacent channel estimates in time using the following equation: $\phi_n = \angle (\Sigma_k \Sigma_{m \in N_{rb}^{common}} y_{k,m,n-\Delta n}'(y_{k,m,n}')^*)$, where $\Delta n$ is the index difference between the two SRS time instances (the default value is 1), and $N_{rb}^{common}$ is a set of RB indices that are common to both SRS time instances and is configurable. Considering a possible frequency shift, the summation over m may be performed only for the common RBs which is known by $N_{rb}^{common}$.

As the estimated phase is common to all antennas and RBs, the phase offset can be removed by: $y_{k,m,n}'' = y_{k,m,n}' \cdot e^{j\Phi_n}$.

As with timing offset estimation and compensation, the reference point can be one of the channel estimates, and the frequency offset estimation and compensation is sequentially performed.

Random timing and frequency offset estimation and compensation in the tracking stage (e.g., 804 as illustrated in FIG. 8) is as follows. In one embodiment, an integer timing offset jump is estimated by employing the hypothesis testing followed by frequency offset estimation. In such embodiment, the new SRS estimate is first rotated by an integer timing offset hypothesis, and then computes cross correlation with a reference channel. The process is iterated for a set of integer timing offset hypotheses, and the integer offset that achieves the highest cross correlation value is used for compensation.

Let $y_{k,m}$ be the most recent SRS channel estimate at the k-th antenna and the m-th RB. $I_{HT} = \{-1_{maxTO}, \ldots, 1_{maxTO}\}$ denotes a set of integer timing offsets for hypothesis testing. A pseudo code of the hypothesis testing is provided as shown in TABLE 2.

TABLE 2

Pseudo code of the hypothesis testing foreach $l_{TO} \in I_{HT}$ do
 $i \leftarrow i + 1$
 $y^{rot}_{k,m} \leftarrow y_{k,m} \cdot e^{j2\pi m \Delta f_{rb} l_{TO} T_s}$, $\forall k$ and $\forall m$
 $a \leftarrow \sum_k \sum_m y^{ref}_{k,m}(y^{rot}_{k,m})^*$ $c_i \leftarrow |a|$
 $\phi_i \leftarrow \angle a$
end for
 $i_{max} \leftarrow argmax_i(c_i)$ TABLE 2-continued Pseudo code of the hypothesis testing $l_{TO} \leftarrow I_{HT}(i_{max})$
$\phi_{FO} \leftarrow \phi_{i_{max}}$ In TABLE 2, $l_{TO}$ is the estimated integer timing offset and $\phi_{FO}$ is the estimated common phase offset. In one embodiment, $y^{ref}$ can be configured to be (1) the previous channel estimate, and in another embodiment, $y^{ref}$ can be (2) the predicted channel. In configuration (1), the hypothesis testing is performed by comparing the two channel estimates. In configuration (2) the predicted channel for this particular SRS capture instance is used. The predicted channel can be either a pure prediction which is a reconstructed channel or a residual-added prediction.

For configuration selection of $y^{ref}$, various metrics such as SRS bandwidth and a UE speed or combinations of such metrics (e.g., weighted sum of metric scores) can be used as selection criteria. For example, if SRS bandwidth>bandwidth threshold and/or UE speed<speed threshold, configuration (1) is used, otherwise, configuration (2) is used.

For combining of metrics, the following equation can be used as an example: S(metric1, metric2, . . . , metric n)=$\Sigma_{i=1}^{n} w_i \times f_i$(metric$_i$) where $w_i$ and $f_i(\cdot)$ are a weight and a score function of a metric associated with the index i, and S($\cdot$) is the score combining function that combines multiple metric scores.

In one embodiment, the timing offset correction is applied in stored channel estimates in the buffer. In another embodiment, the timing offset correction can be applied in the latest incoming SRS. One possible criterion for correction location selection is TO range. For example, if TO range>TO range threshold, correct TO in the SRS buffer, otherwise correct TO in the latest incoming SRS.

In one embodiment, where the timing offset correction is applied in stored channel estimates in the buffer, $l_{TO}$ is inversely applied to the previous channel estimates for TO correction. Refer to the following pseudo code as shown in TABLE 3:

TABLE 3

Pseudo code.

for n = 2 to $N_{srs}$ do
$y_{k,m,n} \leftarrow y_{k,m,n} \cdot e^{-j2\pi m \Delta f_{rb} l_{TO} T_s}$, $\forall k$ and $\forall m$
end for In TABLE 3, $y_{k,m,n}$ is the SRS channel estimate history stored in a buffer. Note that the for loop iteration is from 2 to $N_{STS}$ and the negative sign is in the exponent. The for-loop iteration does not include the oldest estimate (n=1) which will be discarded.

In another embodiment, where the timing offset correction is applied in the latest channel estimate, to apply the TO correction, the following equation can be used: $y_{k,m}' = y_{k,m} \cdot e^{j2\pi m \Delta f_{rb} l_{TO} T_s}$.

As with the timing offset correction, FO can also be corrected either in the buffer or in the latest SRS. For example, in order to apply FO correction in the latest SRS, the following equation can be used: $y_{k,m,n}'' = y_{k,m,n}' e^{j\phi_{FO}}$ where $y_{k,m}''$ is the FO-corrected channel estimate. $y_{k,m}''$ now is pushed to the buffer in a first input first output (FIFO) fashion so that the oldest SRS channel estimates is discarded.

In some embodiments, additional filtering (e.g., moving average, FIR filter, etc.) may be applied to either or both of estimated TO and FO.

In another embodiment, the sub-band SRS which occupies a fraction of bandwidth is considered. In this embodiment, random timing offset estimation and compensation (e.g., steps 702 and 704) in the initial stage (e.g., 802 as illustrated in FIG. 8) is as follows.

In the similar manner to the full-band case, the delay CoG is computed for each SRS time snapshot. Let $y_{k,m,n}$ be the SRS channel estimate at the k-th antenna, the m-th RB and the n-th SRS time snapshot in the buffer. For every time snapshot, the delay CoG is computed using the following equation:

$$\tau_{cog,n} = \frac{\angle(\sum_k \sum_m y_{k,m+\Delta m,n} y_{k,m,n}^*)}{-2\pi \Delta m \Delta f_{rb}}.$$

In one embodiment, the integer TO offset correction may be used as with the full-band approach. Another embodiment removes the delay CoG in each SRS time snapshot without comparison among adjacent snapshots by using: $y_{k,m,n}' = y_{k,m,n} \cdot e^{j2\pi m \Delta f_{rb} \tau_{cog,n}}$.

By removing the delay CoG, the frequency offset estimation and compensation is facilitated.

Random frequency offset estimation and compensation (e.g., 1006 and 1008 as illustrated in FIG. 10) in the initial stage (e.g., 802 as illustrated in FIG. 8) is as follows. The subband SRS FO compensation in the initial acquisition stage considers frequency hopping pattern of subband SRS and some overlapping RBs in adjacent SRS time instances. It may be assumed that the adjacent edge RBs in two subband SRS captures have a similar over-the-air channel, i.e., the estimated common phase shift (CPS) is mainly caused by FO rather than channel variation due to UE mobility. To remove CPS for all SRS captures in the initial SRS buffer, a series of CPS estimation and removal is performed, which takes $N_{srs}-1$ repetitive steps. The exact order and number of edge RBs (ERBs) are input parameters. This FO removal method is also known as edge RB stitching (ERS).

The input signal is $\{y_{k,m,n}\}_{k=1 \sim N_{ant}, m=1 \sim N_{rb}, n=1 \sim N_{srs}}$, and then follow a pre-defined operation order $\{A_l\}_{l=1 \sim N_{srs}-1}$ designed for specific SRS hopping patterns. The input signal conveys important information for ERS method. At each step l, the input signal contains time index $n_{cur,l}$ and edge RB index $m_{cur,l}$ for the current subband, as well as the time index $n_{ref,l}$ and edge RB index $m_{ref,l}$ for the reference subband. Both $m_{cur,l}$ and $m_{ref,l}$ represent the local RB index with the first RB in the same subband labelled as 1. The assumption is that the number of edge RB index is the same in $m_{cur,l}$ and $m_{ref,l}$, which is denoted by $N_{eRB}$. If no overlapping RBs are sounded between the current and reference subband, $N_{eRB}$ equals 1.

Examples of $\{A_l\}_{l=1 \sim N_{srs}-1}$ for two types of subband SRS hopping patterns are provided below.

For LTE with 20 MHz bandwidth where the total RB index is from 0 to 99, SRS periodicity is 10 ms. SRS the starting frequency index for hopping SRS follows [2, 50, 26, 74, 2, 50, 26, 74], and each subband has 24 RBs.

Figure 11:
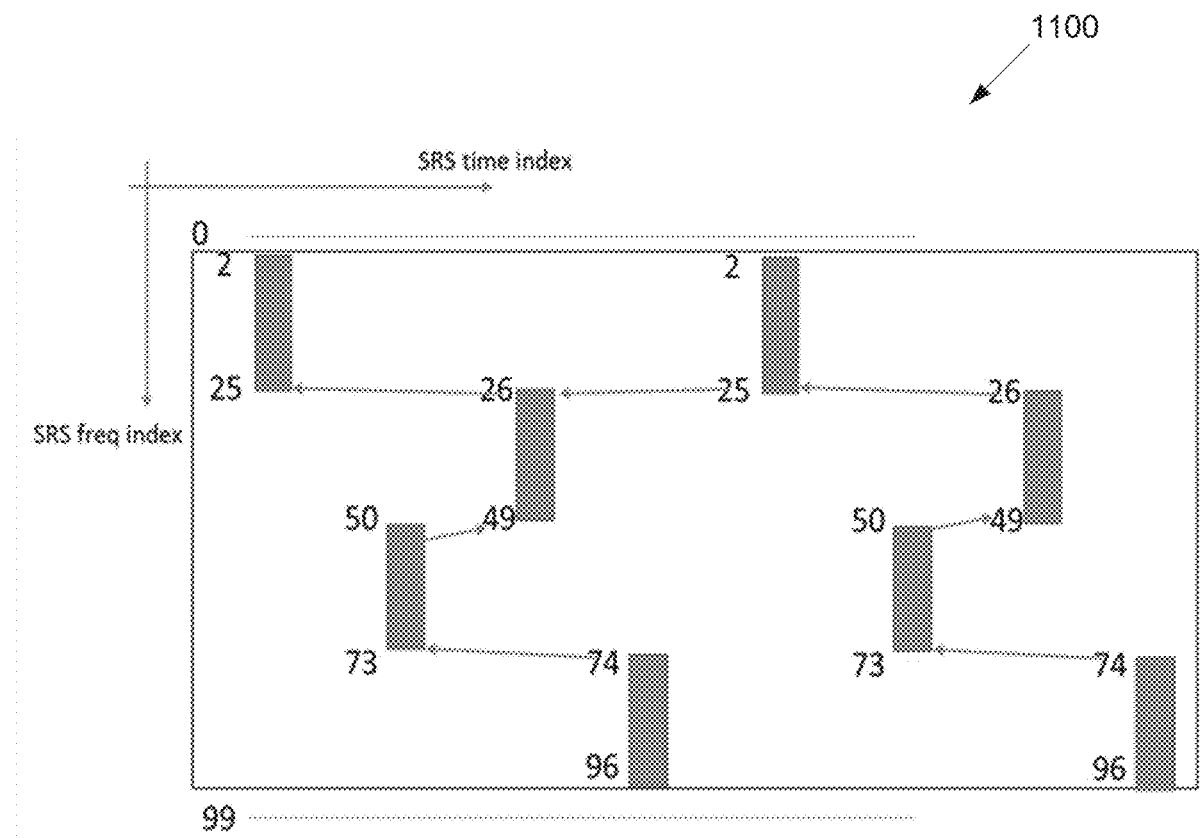
FIG. 11 illustrates an example edge RB stitching for 10 ms periodicity according to embodiments of the present disclosure.

FIG. 11 illustrates an example edge RB stitching 1100 for 10 ms periodicity according to embodiments of the present disclosure. An embodiment of the edge RB stitching 1100 shown in FIG. 11 is for illustration only.

The time index for the reference and current subband are given by $\{n_{ref,l}\}=[1, 3, 2, 3, 5, 7, 6]$ and $\{n_{cur,l}\}=[3, 2, 4, 5, 7, 6, 8]$.

Since no overlapping RBs are sounded between any reference and current subband in this example, $N_{eRB}$ equals 1 by default. The frequency index for the reference and current subband are given by $\{m_{ref,l}\}=[[24], [24], [24], [1], [24], [24], [24]]$ and $\{m_{cur,l}\}=[[1], [1], [1], [24], [1], [1], [1]]$. Here both $m_{cur,l}$ and $m_{ref,l}$ are local RB index.

For LTE with 20 MHz bandwidth where the total RB index is from 0 to 99, SRS periodicity is 5 ms. The starting frequency index for hopping SRS follows [48, 28, 72, 4, 48, 28, 72, 4], and each subband has 24 RBs.

Figure 12:
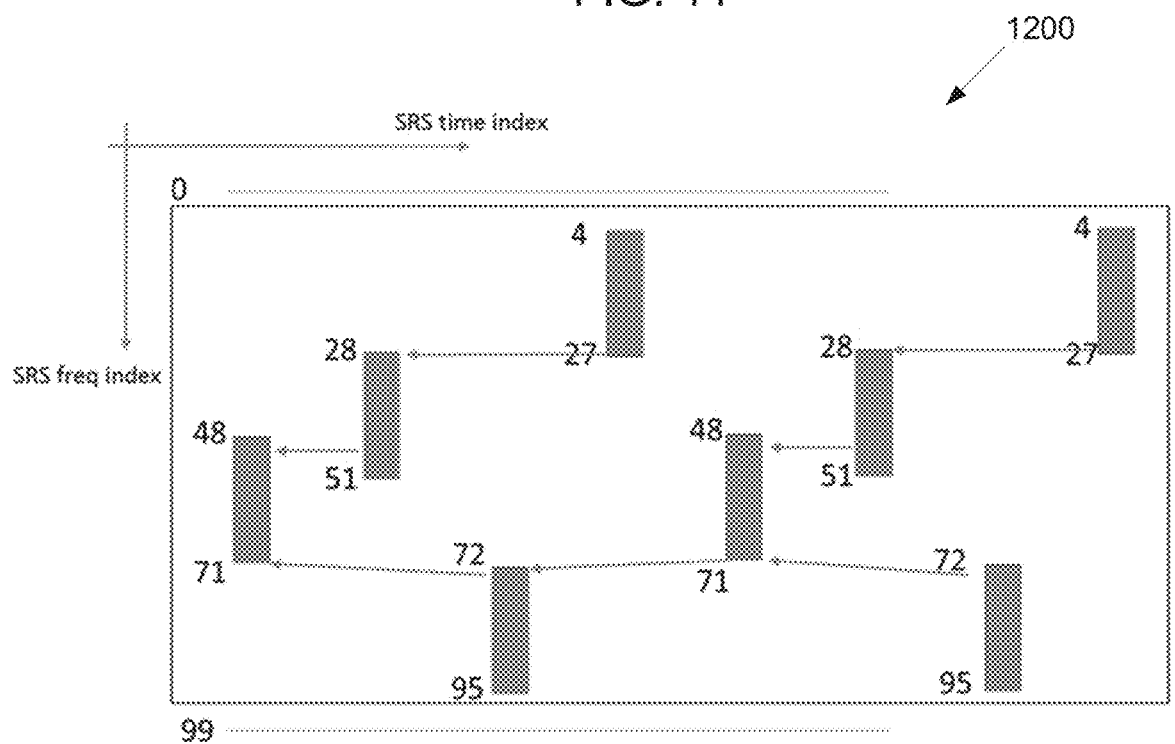
FIG. 12 illustrates another example edge RB stitching for 5 ms SRS periodicity according to embodiments of the present disclosure.

FIG. 12 illustrates another example edge RB stitching 1200 for 5 ms SRS periodicity according to embodiments of the present disclosure. An embodiment of the edge RB stitching 1200 shown in FIG. 12 is for illustration only.

The time index for the reference and current subband are given by $\{n_{ref,l}\}=[1, 1, 2, 3, 5, 5, 6]$ and $\{n_{cur,l}\}=[2, 3, 4, 5, 6, 7, 8]$.

Because two subband captures have 4 overlapping RBs, $N_{eRB}$ equals 4 for two instances, while $N_{eRB}$ equals 1 for the rest by default. The frequency index for the reference and current subband are given by $\{m_{ref,l}\}=[[1:4], [24], [1], [1], [1:4], [24], [1]]$ and $\{m_{cur,l}\}=[[21:24], [1], [24], [24], [21:24], [1], [24]]$. Here both $m_{cur,l}$ and $m_{ref,l}$ are local RB index.

The main steps of ERS are summarized as following.

In one example of step 1, $n_{cur,l}$ and $m_{cur,l}$ are loaded for the current subband, as well as $n_{ref,l}$ and $m_{ref,l}$ for the reference subband, which is provided in $A_l$.

In one example of step 2, the CPS is calculated between selected RBs of this pair of subband SRS captures: $\phi_l = \angle (\Sigma_{i,k} y_{k,m_{ref,l,i},n_{ref,l}} y_{k,m_{cur,l,i},n_{cur,l}}^*)$.

In one example of step 3, the current subband with estimated CPS is compensated in the initial buffer for all related frequency points and antennas: $y_{k,m,n_{cur,l}} = y_{k,m,n_{cur,l}} \cdot e^{j\phi_l}$, $\forall k$ and $\forall m$.

In one example of step 4, step 1+1 is performed and the above three steps are repeated until 1 is $N_{srs}-1$.

Similarly, the estimation and compensation of FO is done in a sequential manner, i.e., the reference SRS at each step 1 is always a FO-corrected one. This assumption is fulfilled by carefully designing the operation order $\{A_l\}_{l=1 \sim N_{STS}-1}$, which also depends on SRS hopping patterns.

One fundamental of the provided FO and TO estimation algorithm is that it assumes channel response remains similar in the reference signal and the signal whose FO and TO need estimation. The above RB selection and estimation order follows a principle that the reference signal and the signal to be estimated are close in both time and frequency. In one embodiment, only a single RB is used. In some embodiments it may use multiple RBs across frequency and time.

In another embodiment, finite length filtering (e.g., FIR filter) is used to filter estimation results from multiple RBs. Alternatively, FIR can be used to filter intermediate results, such as the complex inner product, generated from multiple RBs. FIR coefficients can be controlled or influenced by other modules or design.

In another embodiment, time-domain correlations between SRS instances that share the identical frequency sub-band are used together with ERS. The time-domain correlation can be computed using: $\theta_l = \angle(\Sigma_i^k y_{k,m_{ref,l,i},n_{ref,l}} y_{k,m_{cur,l,i},n_{cur,l}}^*)$ where $\theta_l$ is the CPS between the same sub-band SRS by setting the following parameters: $\{n_{ref,l}\}=[5, 6, 7, 8]$, $\{n_{cur,l}\}=[1, 2, 3, 4]$, $\{m_{ref,l}\}=[[1, 2, \ldots, 24], [1, 2, \ldots, 24], [1, 2, \ldots, 24], [1, 2, \ldots, 24]]$ and $\{m_{cur,l}\}=[[1, 2, \ldots, 24], [1, 2, \ldots, 24], [1, 2, \ldots, 24], [1, 2, \ldots, 24]]$. To combine of ERS and the time-domain correlation approaches, the following combining equation can be used: $S_l(\phi_l, \theta_l) = w_\phi \cdot f_\phi(\phi_l) + w_\theta \cdot f_\theta(\theta_l)$.

Random timing and frequency offset estimation and compensation in the tracking stage (e.g., 804 as illustrated in FIG. 8) is as follows. The timing and frequency offset estimation and compensation with the sub-band SRS is almost identical to the one with the full-band SRS. The timing and frequency offset estimation and compensation with the sub-band SRS is performed for the new incoming SRS channel estimate based on the hypothesis testing. The difference is $N_{rb}$, which is inherently different depending on the subband size.

Figure 13:
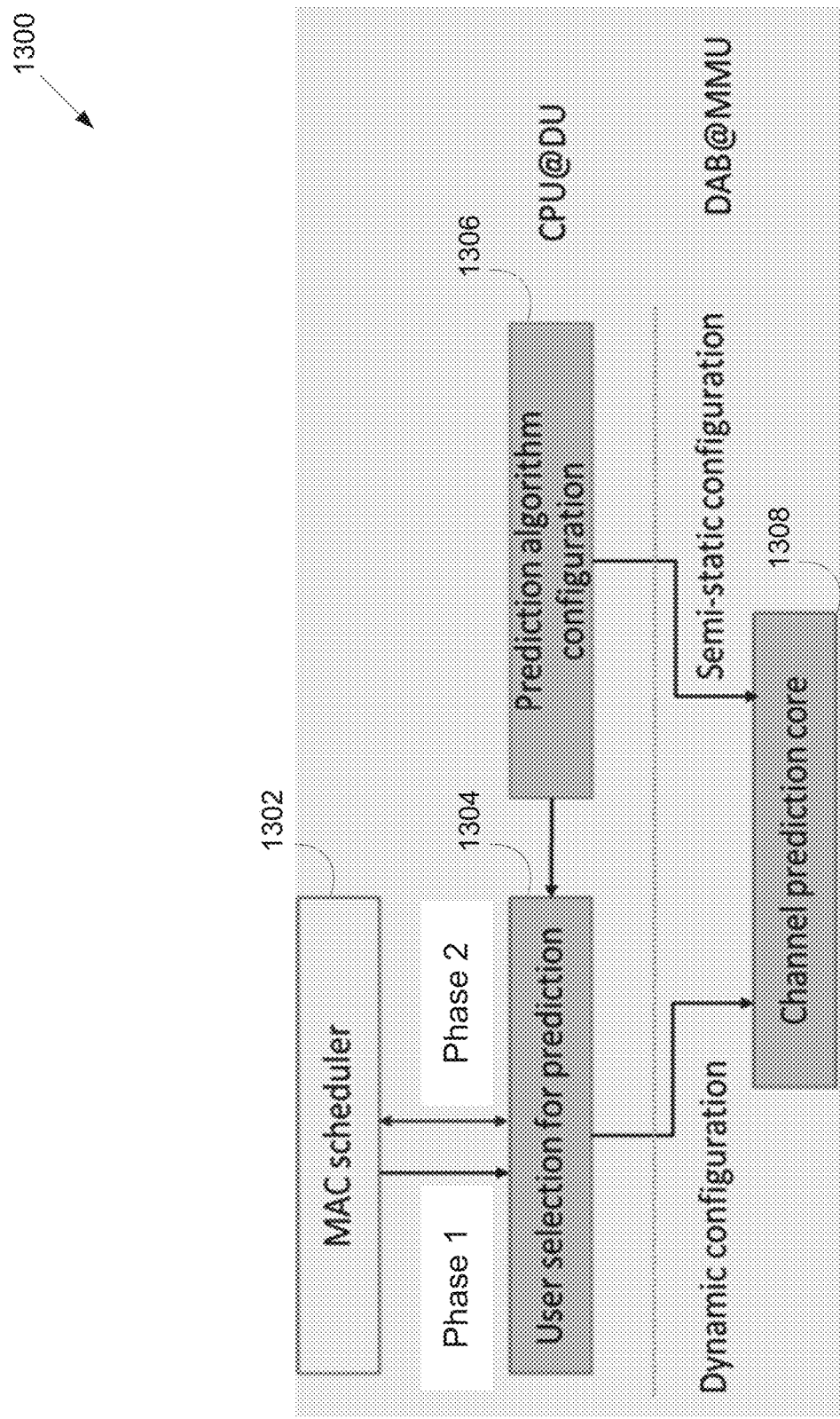
FIG. 13 illustrates an example overall diagram for channel prediction according to embodiments of the present disclosure.

FIG. 13 illustrates an example overall diagram 1300 for channel prediction according to embodiments of the present disclosure. An embodiment of the overall diagram 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, the diagram 1300 comprises a MAC scheduler block 1302, a user selection for prediction block 1304, a prediction algorithm configuration block 1306, and a channel prediction core block 1308.

Figure 14:
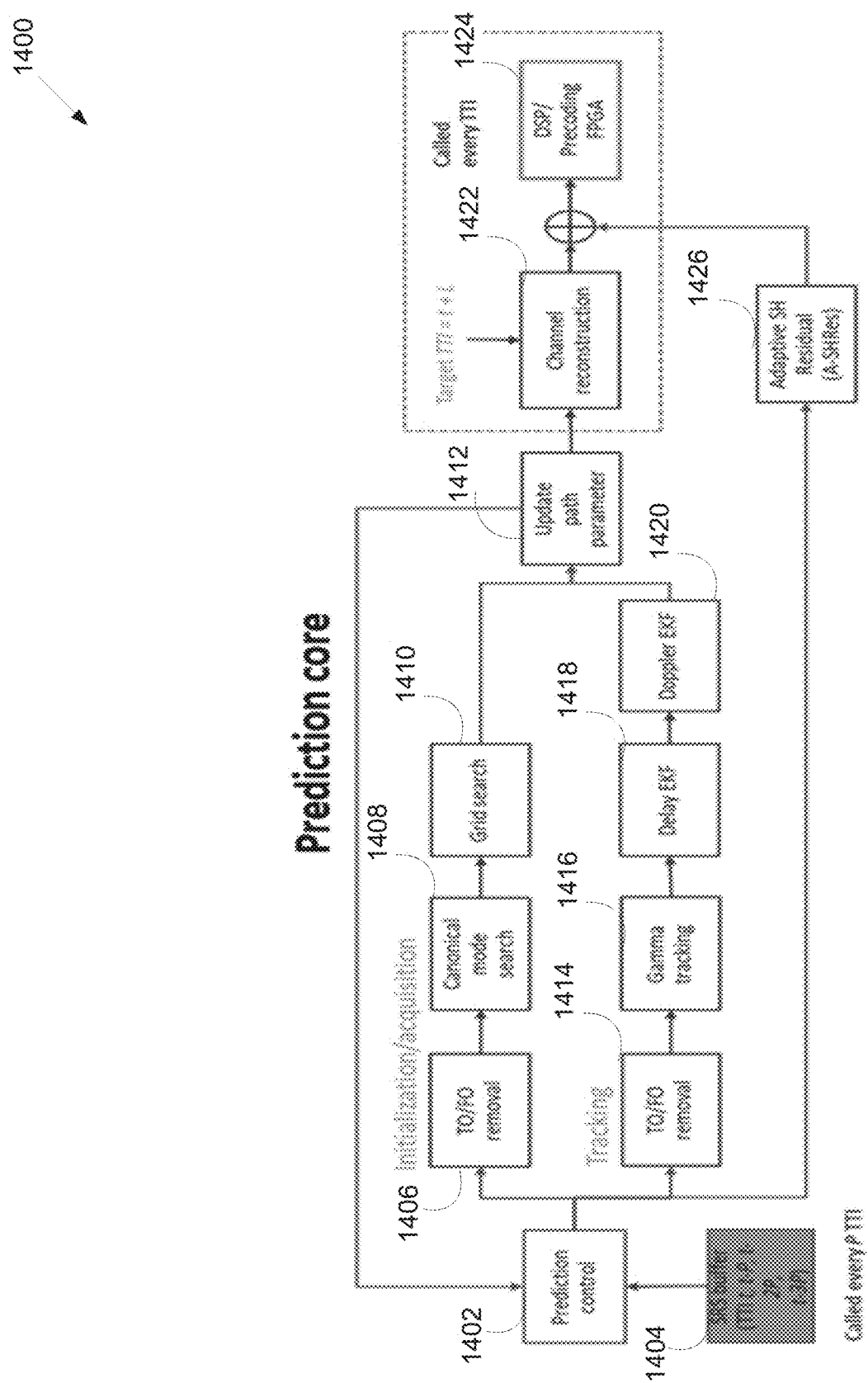
FIG. 14 illustrates an example prediction core according to embodiments of the present disclosure.

FIG. 14 illustrates an example prediction core 1400 according to embodiments of the present disclosure. An embodiment of the prediction core 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, a prediction control operation begins at the prediction control block 1402 with an input from SRS buffer 1404 and an input from update path parameter block 1412. An output of the prediction control block 1402 is transmitted to TO/FO removal block 1406 for initialization and acquisition operation and TO/BO removal block 1414 for tracking operation. At block 1408, canonical mode search is performed and a grid search is performed at block 1410. At step 1413, path parameters are updated. At block 1416, Gamma tracking is performed. At block 1414 and 1420, a delay EKF and a Doppler EKF are applied, respectively. At block 1422, a channel reconstruction is performed and then DSP/precoding is performed at block 1424, with an input from adaptive SH residual block 1426.

Figure 15:
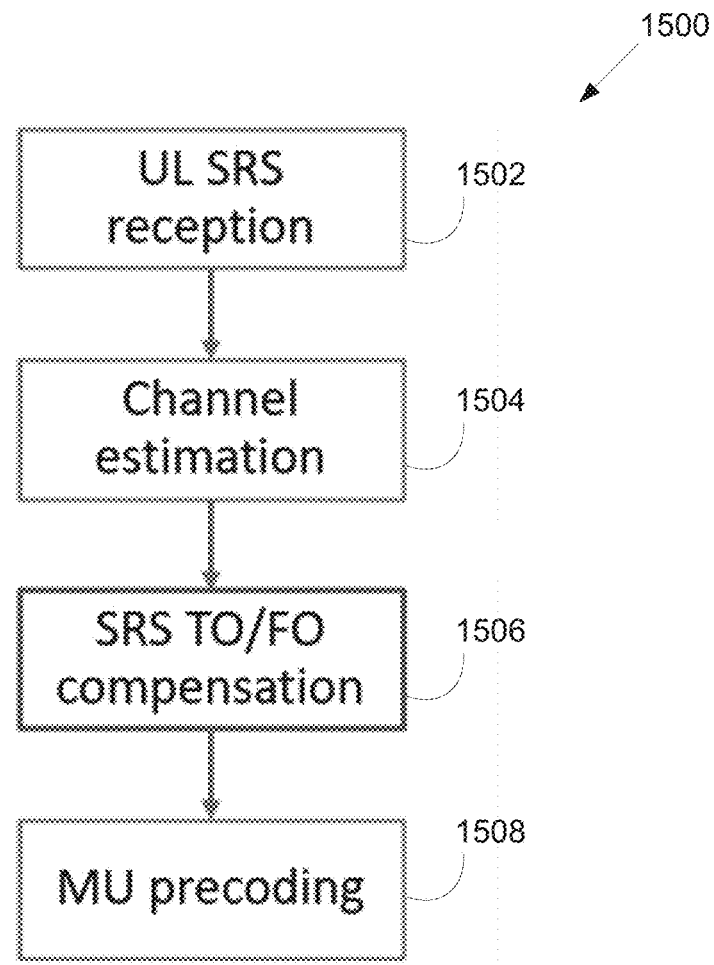
FIG. 15 illustrates a flowchart of method for SRS processing according to embodiments of the present disclosure.

FIG. 15 illustrates a flowchart of method 1500 for SRS processing according to embodiments of the present disclosure. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, the method 1500 begins at step 1502. In step 1502, the method 1500 receives UL SRS. At step 1504, the method 1500 performs channel estimation. Next, at step 1506, the method 1500 performs SRS TO/FO compensation. Finally, the method 1500 at step 1508 performs multi-user (MU) precoding.

Figure 16:
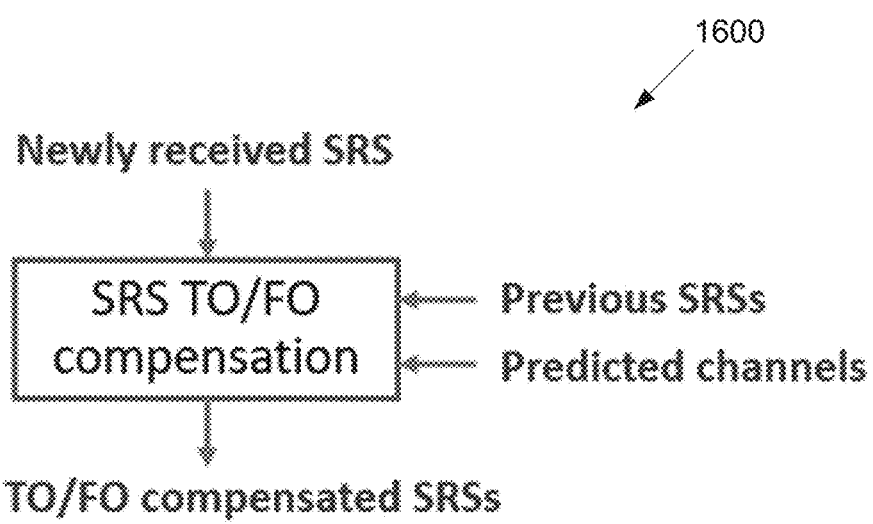
FIG. 16 illustrates an example TO/FO compensation according to embodiments of the present disclosure.

FIG. 16 illustrates an example TO/FO compensation 1600 according to embodiments of the present disclosure. An embodiment of the TO/FO compensation 1600 shown in FIG. 16 is for illustration only. The component illustrated in FIG. 16 can be implemented in specialized circuitry configured to perform the noted functions or one or more of the components can be implemented by one or more processors executing instructions to perform the noted functions.

As illustrated in FIG. 16, an SRS TO/FO compensation is performed to generate TO/FO compensated SRS using a newly received SRS, previous SRS, and predicted channels.

Figure 17:
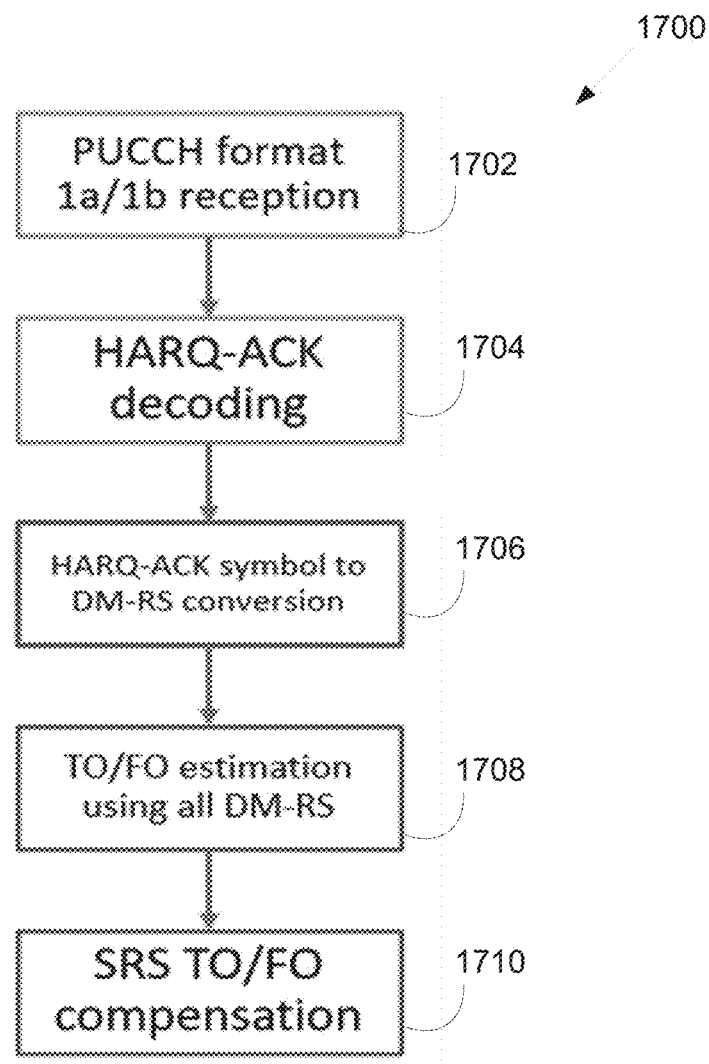
FIG. 17 illustrates a flowchart of method for PUCCH H-ARQ processing according to embodiments of the present disclosure.

FIG. 17 illustrates a flowchart of method 1700 for PUCCH H-ARQ processing according to embodiments of the present disclosure. An embodiment of the method 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

As illustrated in FIG. 17, the method 1700 begins at step 1702. At step 1702, the method 1700 receives PUCCH format 1a/1b. Subsequently, the method 1700 at step 1704 decodes HARQ-ACK. Subsequently, at step 1706, the method 1700 convert the HARQ-ACK symbol to DMRS. Next, at step 1708, the method 1700 performs TO/FO estimation using all DMRS. Finally, the method 1700 at step 1710 performs SRS TO/FO compensation.

Figure 18:
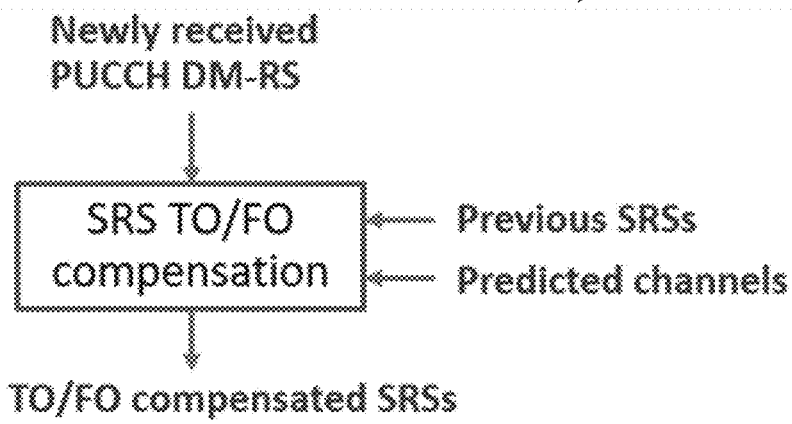
FIG. 18 illustrates an example TO/FO compensation according to embodiments of the present disclosure.

FIG. 18 illustrates an example TO/FO compensation 1800 according to embodiments of the present disclosure. An embodiment of the TO/FO compensation 1800 shown in FIG. 18 is for illustration only. The component illustrated in FIG. 18 can be implemented in specialized circuitry configured to perform the noted functions or one or more of the components can be implemented by one or more processors executing instructions to perform the noted functions.

As illustrated in FIG. 18, TO/FO compensated SRSs are generated with newly received PUCCH DM-RS, previous SRSs, and predicted channels.

Figure 19:
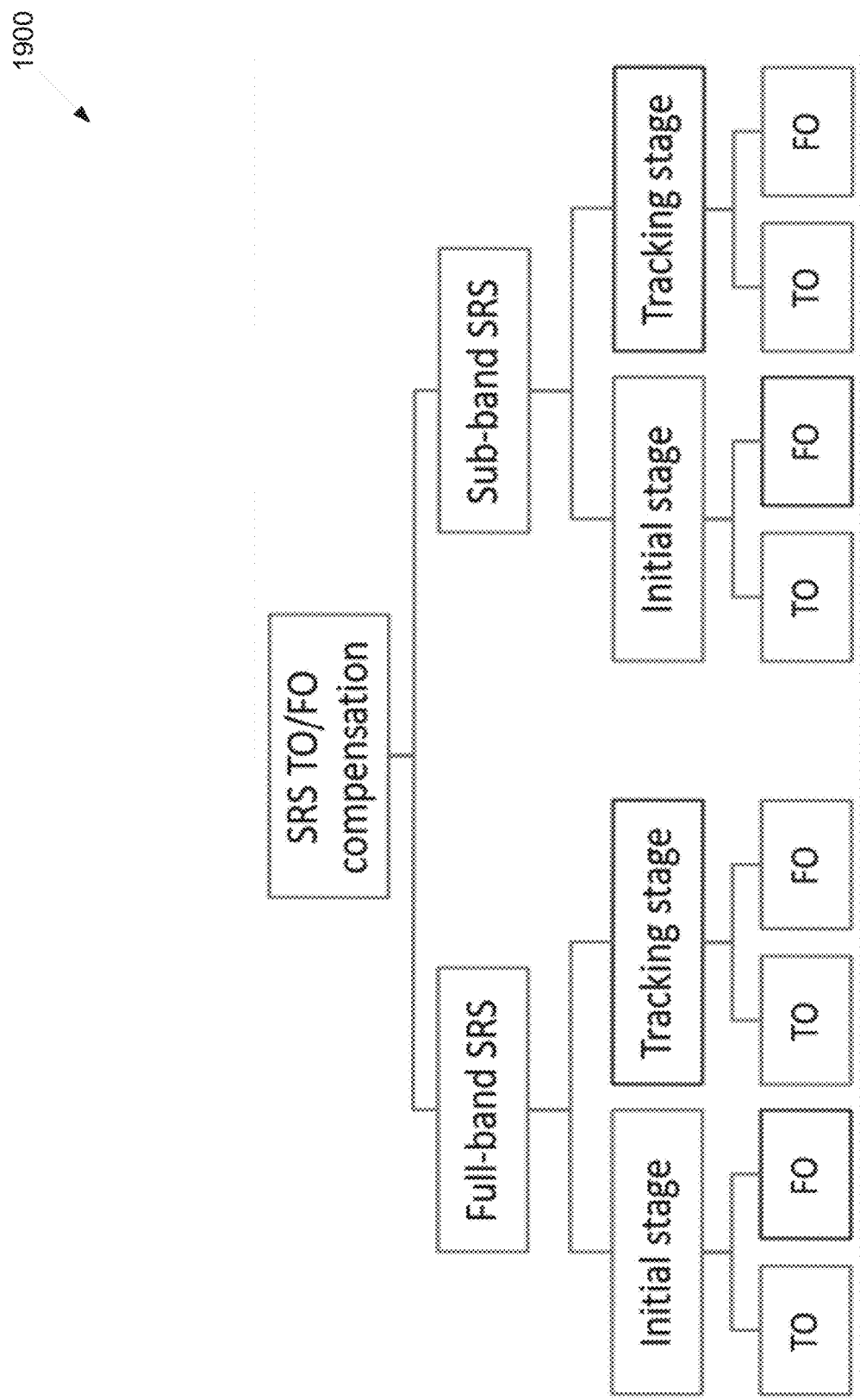
FIG. 19 illustrates an example SRS TO/FO compensation according to embodiments of the present disclosure.

FIG. 19 illustrates an example SRS TO/FO compensation 1900 according to embodiments of the present disclosure. An embodiment of the SRS TO/FO compensation 1900 shown in FIG. 19 is for illustration only.

As illustrated in FIG. 19, SRS TO/FO compensation is performed based on a full-band SRS and a sub-band SRS.

Figure 20:
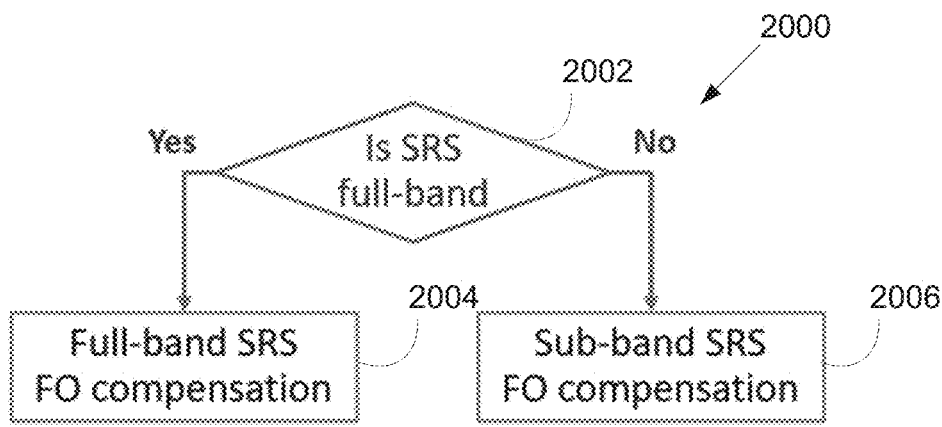
FIG. 20 illustrates a flowchart of method for FO compensation according to embodiments of the present disclosure.

FIG. 20 illustrates a flowchart of method 2000 for FO compensation according to embodiments of the present disclosure. An embodiment of the method 2000 shown in FIG. 2 is for illustration only. One or more of the components illustrated in FIG. 20 can be implemented in specialized circuitry configured to perform the noted functions or one or more of the components can be implemented by one or more processors executing instructions to perform the noted functions.

As illustrated in FIG. 20, the method 2000 at step 2002 determines whether to use a full-band SRS FO compensation 2004 or a sub-bans SRS FO compensation 2006.

Figure 21:
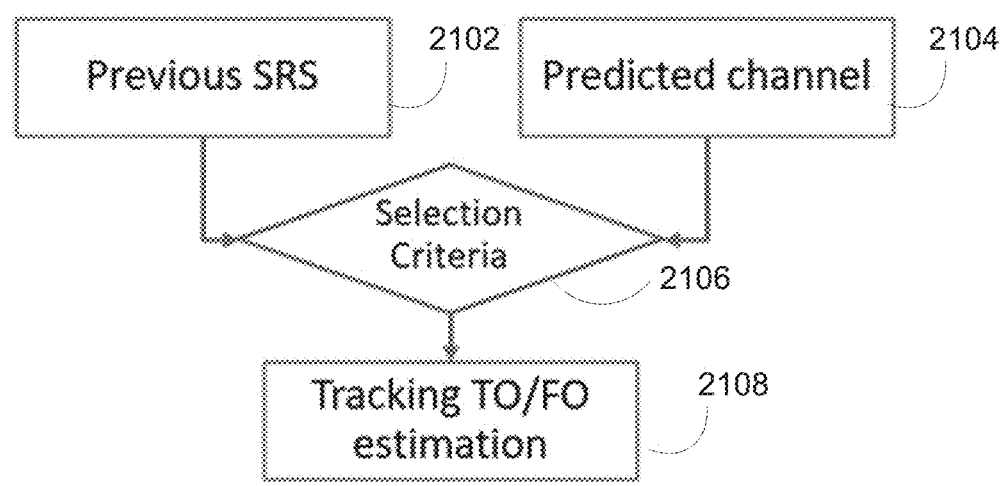
FIG. 21 illustrates a flowchart of method for TO/FO reference channel selection according to embodiments of the present disclosure.

FIG. 21 illustrates a flowchart of method 2100 for TO/FO reference channel selection according to embodiments of the present disclosure. An embodiment of the method 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions.

As illustrated in FIG. 21, the method 2100 at step 2106 determines whether a selection-criteria is satisfied with the previous SRS identifies at step 2102 and the predicted channel is identified at step 2104. At step 2108, the method 2100 performs tracking TO/FO estimation.

Figure 22:
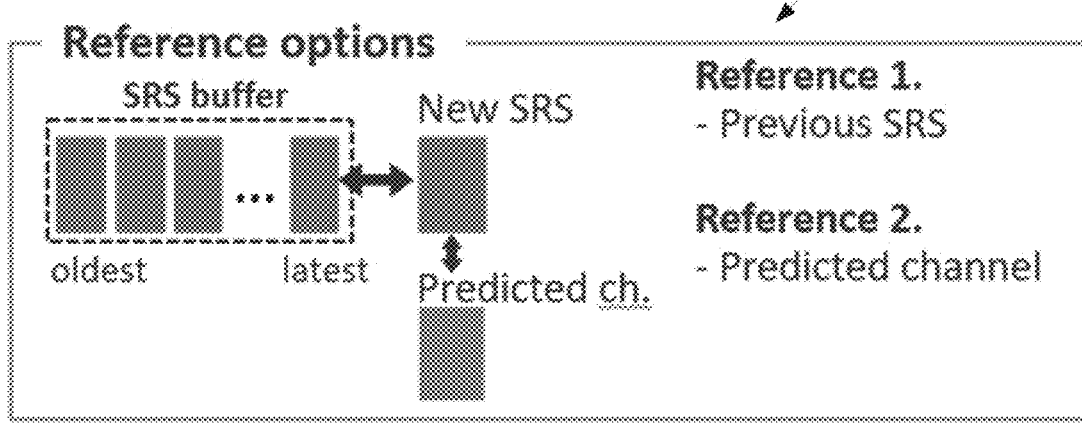
FIG. 22 illustrates an example reference options according to embodiments of the present disclosure.

FIG. 22 illustrates an example reference options 2200 according to embodiments of the present disclosure. An embodiment of the reference options 2200 shown in FIG. 22 is for illustration only.

As illustrated in FIG. 22, the reference options 2200 comprises a reference 1 with previous SRS and a reference 2 with a predicted channel.

Figure 23:
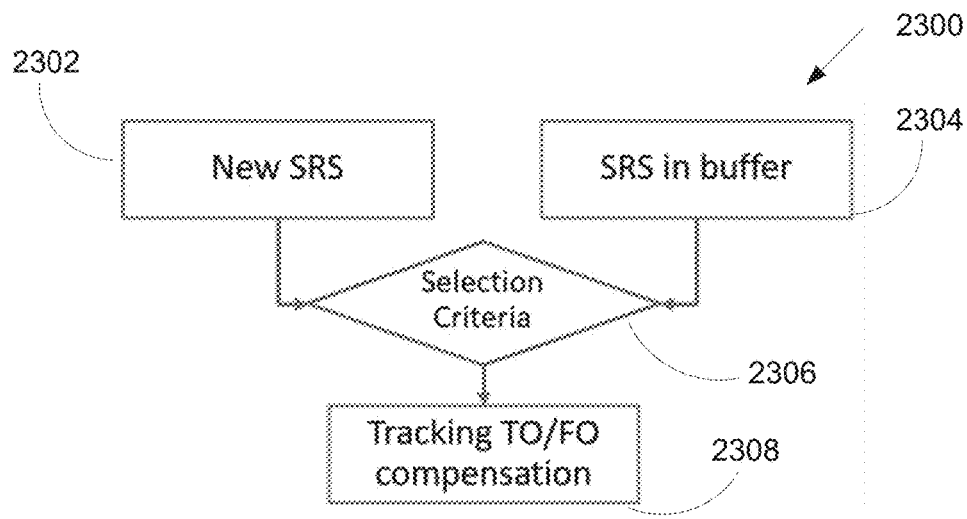
FIG. 23 illustrates a flowchart of method for TO/FO compensation location according to embodiments of the present disclosure.

FIG. 23 illustrates a flowchart of method 2300 for TO/FO compensation location according to embodiments of the present disclosure. An embodiment of the method 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions.

As illustrated in FIG. 23, the method 2300 determines whether a selection-criteria is satisfied at step 2306 using a new SRS identified at step 2302 and an SRS in buffer identified at step 2304. At step 2308, the method 2300 performs tracking TO/FO compensation.

Figure 24:
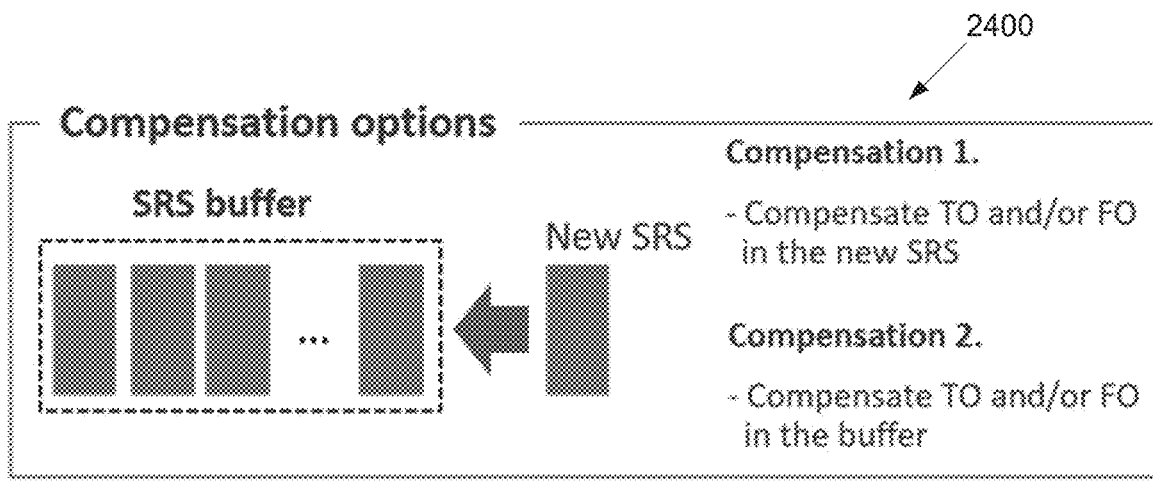
FIG. 24 illustrates an example compensation options according to embodiments of the present disclosure.

FIG. 24 illustrates an example compensation options 2400 according to embodiments of the present disclosure. An embodiment of the compensation options 2400 shown in FIG. 24 is for illustration only.

As illustrated in FIG. 24, the compensation options 2400 comprises a compensation 1 to compensate TO and/or FO in the new SRS and compensation 2 to compensate TO and/or FO in the buffer.

Figure 25:
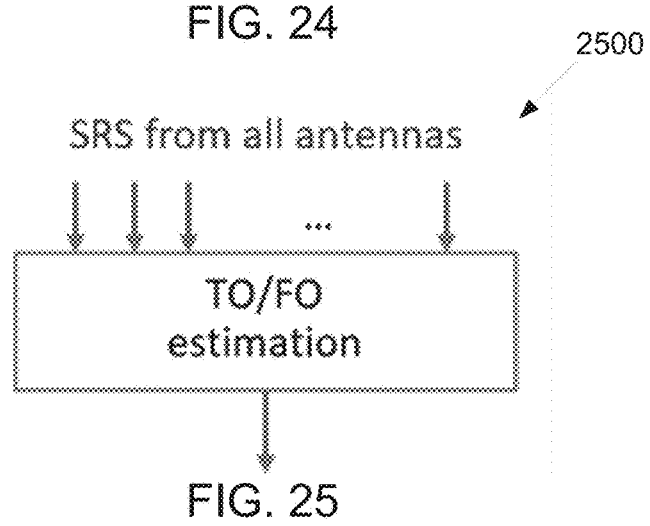
FIG. 25 illustrates an example SRS processing according to embodiments of the present disclosure.

FIG. 25 illustrates an example SRS processing 2500 according to embodiments of the present disclosure. An embodiment of the SRS processing 2500 shown in FIG. 25 is for illustration only. The component illustrated in FIG. 25 can be implemented in specialized circuitry configured to perform the noted functions or one or more of the components can be implemented by one or more processors executing instructions to perform the noted functions.

As illustrated in FIG. 25, a TO/FO estimation is performed using SRSs received through all antennas.

Figure 26:
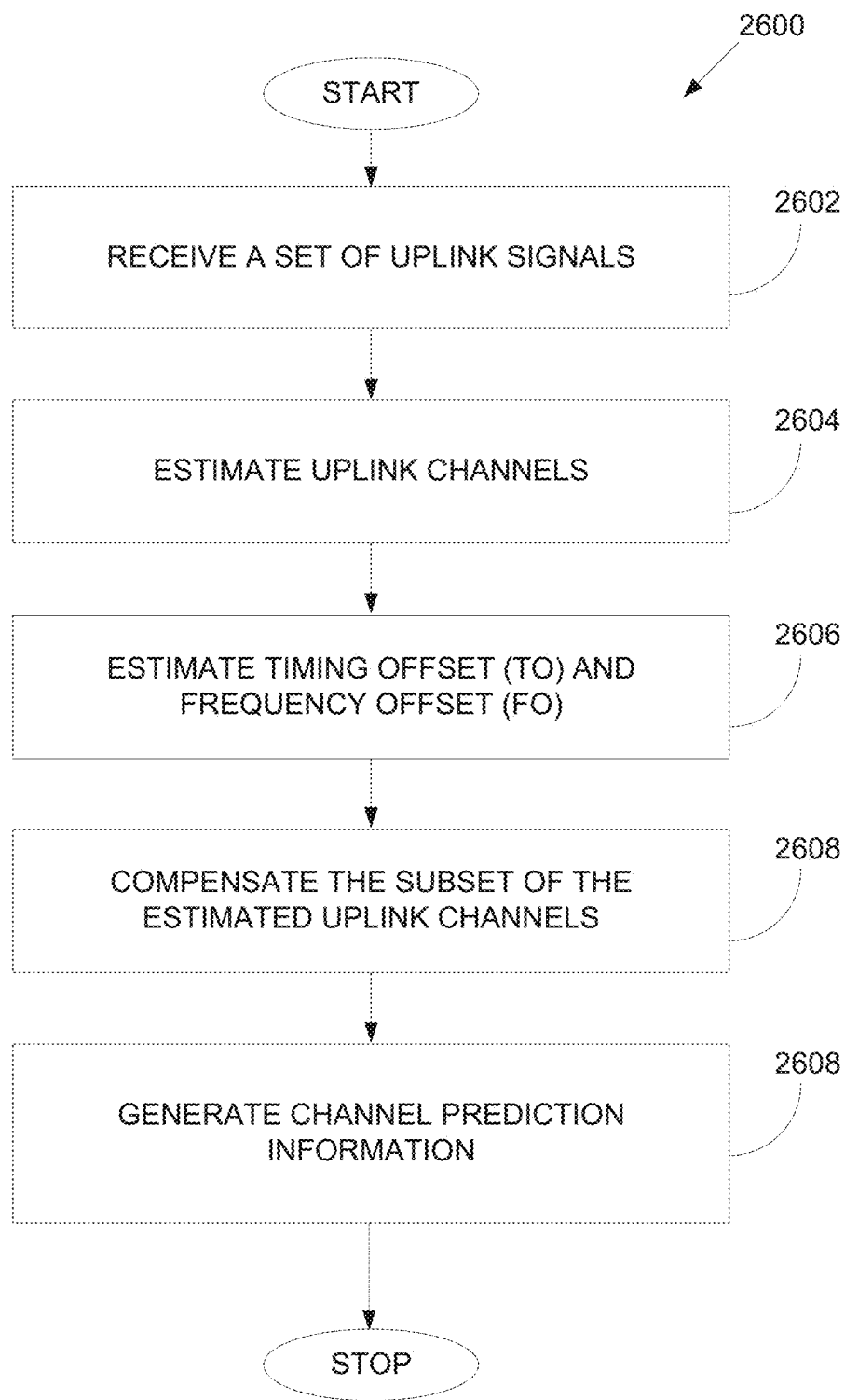
FIG. 26 illustrates a flowchart of a method for uplink timing and frequency offset estimation and compensation for CSI estimation and tracking according to embodiments of the present disclosure.

FIG. 26 illustrates a flowchart of a method 2600 for uplink timing and frequency offset estimation and compensation for CSI estimation and tracking according to embodiments of the present disclosure, as may be performed by a BS (e.g., 101-103 as illustrated in FIG. 1). An embodiment of the method 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions.

As illustrated in FIG. 26, the method of 2600 begins at step 2602. In step 2602, a BS receives a set of uplink signals.

Subsequently, in step 2604, the BS estimates, based on a subset of the set of uplink signals, uplink channels.

Subsequently, in step 2606, the BS estimates a TO and an FO for a subset of the estimated uplink channels.

Next, in step 2608, the BS compensates, based on the estimated TO and FO, the subset of the estimated uplink channels.

Finally, in step 2610, the BS generates channel prediction information based on the compensated subset of the estimated uplink channels.

In one embodiment, the BS receives second uplink signals including the subset of the set of uplink signals after receipt of first uplink signals and predicts a reference signal based on a portion of past history of TO and FO compensated uplink channel estimates, wherein the set of uplink signals comprises the first uplink signals that are stored in a buffer.

In one embodiment, the BS identifies, based on the second uplink signals, an operation mode of the second uplink signals to compensate the FO, selects a reference channel based on information of the first uplink signals and the estimated uplink channels to track a TO estimation and an FO estimation, and selects a location of the TO from the first uplink signals or the second uplink signals to track a TO compensation and an FO compensation.

In such embodiment, the operation mode comprises a full-band (e.g., frequency non-hopped) SRS mode using a whole bandwidth for the FO compensation and a sub-band (e.g., frequency-hopped) SRS mode using a fraction of the whole bandwidth for the FO compensation.

In one embodiment, the BS enables, using a set of adjacent edge resource blocks (ERBs) in the fraction of the whole bandwidth, an ERB stitching operation for the FO compensation.

In one embodiment, the BS receives a PUCCH, identifies a PUCCH format of the PUCCH, and decodes, based on the PUCCH format, a HARQ-ACK included in the PUCCH.

In one embodiment, the BS converts a symbol for the HARQ-ACK to a DMRS of the PUCCH, estimates the TO and the FO based on the DMRS of the PUCCH, and generates the channel prediction information based on the DMRS of the PUCCH and the compensated subset of the estimated uplink channels.

In one embodiment, the BS identifies a selection metric to select a reference channel, wherein the selection metric is determined based on an operation mode of the subset of the set of uplink signals and a speed of the UE.

In one embodiment, the BS identifies a TO range to select a location of TO, the TO range being a time interval for tracking a TO compensation and an FO compensation, identifies a threshold to determine whether the TO range is greater than the threshold, and selects the location of TO from the set of uplink signals based on a determination that the TO range is greater than the threshold.

In one embodiment, the BS identifies the set of uplink signals received through all antennas that are configured at the BS, and tracks a TO estimation and an FO estimation based on an operation mode of the set of uplink signals received through all antennas.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:
   a transceiver configured to receive a set of uplink signals; and
   a processor operably connected to the transceiver, the processor configured to:
      estimate, based on a subset of the set of uplink signals, uplink channels,
      estimate a timing offset (TO) and a frequency offset (FO) for a subset of the estimated uplink channels, wherein the TO is identified in a TO range,
      compensate, based on the estimated TO and FO, the subset of the estimated uplink channels to generate TO and FO compensated uplink channel estimates, and
      generate channel prediction information based on the compensated subset of the estimated uplink channels.

2. The BS of claim 1, wherein:
   the set of uplink signals comprises first uplink signals that are stored in a buffer;
   the transceiver is further configured to receive second uplink signals including the subset of the set of uplink signals after receipt of the first uplink signals; and
   the processor is further configured to predict a reference signal based on a portion of past history of the TO and FO compensated uplink channel estimates.

3. The BS of claim 2, wherein the processor is further configured to:
   identify, based on the second uplink signals, an operation mode of the second uplink signals to compensate the FO;
   select a reference channel based on information of the first uplink signals and the estimated uplink channels to track a TO estimation and an FO estimation; and
   select a location of the TO from the first uplink signals or the second uplink signals to track a TO compensation and an FO compensation.

4. The BS of claim 3, wherein the operation mode comprises a frequency non-hopped SRS mode using a whole bandwidth for the FO compensation and a frequency-hopped SRS mode using a fraction of the whole bandwidth for the FO compensation.

5. The BS of claim 4, wherein the processor is further configured to enable, using a set of adjacent edge resource blocks (ERBs) in the fraction of the whole bandwidth, an ERB stitching operation for the FO compensation.

6. The BS of claim 1, wherein:
   the transceiver is further configured to receive a physical uplink control channel (PUCCH); and
   the processor is further configured to:
      identify a PUCCH format of the PUCCH, and
      decode, based on the PUCCH format, a hybrid automatic repeat request-acknowledgement (HARQ-ACK) included in the PUCCH.

7. The BS of claim 6, wherein the processor is further configured to:
   convert a symbol for the HARQ-ACK to a demodulation reference signal (DMRS) of the PUCCH;
   estimate the TO and the FO based on the DMRS of the PUCCH; and
   generate the channel prediction information based on the DMRS of the PUCCH and the compensated subset of the estimated uplink channels.

8. The BS of claim 1, wherein the processor is further configured to identify a selection metric to select a reference channel, the selection metric being determined based on an operation mode of the subset of the set of uplink signals and a speed of a user equipment (UE).

9. The BS of claim 1, wherein the processor is further configured to:
   identify the TO range to select a location of TO, the TO range being a time interval for tracking a TO compensation and an FO compensation;
   identify a threshold to determine whether the TO range is greater than the threshold; and
   select the location of TO from the set of uplink signals based on a determination that the TO range is greater than the threshold.

10. The BS of claim 1, wherein the processor is further configured to:
    identify the set of uplink signals received through all antennas that are configured at the BS; and
    track a TO estimation and an FO estimation based on an operation mode of the set of uplink signals received through all antennas.

11. A method of a base station (BS) in a wireless communication system, the method comprising:
    receiving a set of uplink signals;
    estimating, based on a subset of the set of uplink signals, uplink channels;
    estimating a timing offset (TO) and a frequency offset (FO) for a subset of the estimated uplink channels, wherein the TO is identified in a TO range;
    compensating, based on the estimated TO and FO, the subset of the estimated uplink channels to generate TO and FO compensated uplink channel estimates; and
    generating channel prediction information based on the compensated subset of the estimated uplink channels.

12. The method of claim 11, further comprising:
    receiving second uplink signals including the subset of the set of uplink signals after receipt of first uplink signals; and
    predicting a reference signal based on a portion of past history of the TO and FO compensated uplink channel estimates, wherein the set of uplink signals comprises the first uplink signals that are stored in a buffer.

13. The method of claim 12, further comprising:
    identifying, based on the second uplink signals, an operation mode of the second uplink signals to compensate the FO;
    selecting a reference channel based on information of the first uplink signals and the estimated uplink channels to track a TO estimation and an FO estimation; and
    selecting a location of the TO from the first uplink signals or the second uplink signals to track a TO compensation and an FO compensation.

14. The method of claim 13, wherein the operation mode comprises a frequency non-hopped SRS mode using a whole bandwidth for the FO compensation and a frequency-hopped SRS mode using a fraction of the whole bandwidth for the FO compensation.

15. The method of claim 14, further comprising enabling, using a set of adjacent edge resource blocks (ERBs) in the fraction of the whole bandwidth, an ERB stitching operation for the FO compensation.

16. The method of claim 11, further comprising:
    receiving a physical uplink control channel (PUCCH);
    identifying a PUCCH format of the PUCCH; and
    decoding, based on the PUCCH format, a hybrid automatic repeat request-acknowledgement (HARQ-ACK) included in the PUCCH.

17. The method of claim 16, further comprising:
    converting a symbol for the HARQ-ACK to a demodulation reference signal (DMRS) of the PUCCH;
    estimating the TO and the FO based on the DMRS of the PUCCH; and
    generating the channel prediction information based on the DMRS of the PUCCH and the compensated subset of the estimated uplink channels.

18. The method of claim 11, further comprising identifying a selection metric to select a reference channel, wherein the selection metric is determined based on an operation mode of the subset of the set of uplink signals and a speed of a user equipment (UE).

19. The method of claim 11, further comprising:
    identifying the TO range to select a location of TO, the TO range being a time interval for tracking a TO compensation and an FO compensation;
    identifying a threshold to determine whether the TO range is greater than the threshold; and
    selecting the location of TO from the set of uplink signals based on a determination that the TO range is greater than the threshold.

20. The method of claim 11, further comprising:
    identifying the set of uplink signals received through all antennas that are configured at the BS; and
    tracking a TO estimation and an FO estimation based on an operation mode of the set of uplink signals received through all antennas.

* * * * *